(12) United States Patent
Illeperuma et al.

(10) Patent No.: US 10,975,205 B2
(45) Date of Patent: Apr. 13, 2021

(54) HYDROGELS WITH IMPROVED MECHANICAL PROPERTIES BELOW WATER FREEZING TEMPERATURE

(71) Applicant: President and Fellows of Harvard College, Cambridge, MA (US)

(72) Inventors: Widusha Illeperuma, Cambridge, MA (US); Zhigang Suo, Lexington, MA (US); Joost J. Vlassak, Lexington, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 281 days.

(21) Appl. No.: 15/756,054

(22) PCT Filed: Sep. 1, 2016

(86) PCT No.: PCT/US2016/049994
§ 371 (c)(1),
(2) Date: Feb. 27, 2018

(87) PCT Pub. No.: WO2017/040851
PCT Pub. Date: Mar. 9, 2017

(65) Prior Publication Data
US 2018/0244858 A1      Aug. 30, 2018

Related U.S. Application Data

(60) Provisional application No. 62/212,961, filed on Sep. 1, 2015.

(51) Int. Cl.
| | |
|---|---|
| *C08J 3/075* | (2006.01) |
| *C08J 3/24* | (2006.01) |
| *G01L 1/14* | (2006.01) |
| *C08F 220/06* | (2006.01) |
| *C08F 20/56* | (2006.01) |
| *C08K 3/30* | (2006.01) |
| *C08K 3/26* | (2006.01) |
| *C08K 3/10* | (2018.01) |
| *C08K 3/22* | (2006.01) |
| *C08K 3/16* | (2006.01) |

(52) U.S. Cl.
CPC ............. *C08J 3/075* (2013.01); *C08F 20/56* (2013.01); *C08F 220/06* (2013.01); *C08J 3/24* (2013.01); *C08K 3/10* (2013.01); *C08K 3/16* (2013.01); *C08K 3/22* (2013.01); *C08K 3/26* (2013.01); *C08K 3/30* (2013.01); *G01L 1/142* (2013.01); *C08J 2305/04* (2013.01); *C08J 2333/26* (2013.01); *C08K 2003/162* (2013.01); *C08K 2003/164* (2013.01); *C08K 2003/166* (2013.01); *C08K 2003/168* (2013.01); *C08K 2003/2206* (2013.01); *C08K 2003/2217* (2013.01); *C08K 2003/262* (2013.01); *C08K 2003/265* (2013.01); *C08K 2003/3045* (2013.01); *C08K 2003/3063* (2013.01)

(58) Field of Classification Search
CPC ................ C08J 3/075; C08J 3/24; G01L 1/14
See application file for complete search history.

(56) References Cited

U.S. PATENT DOCUMENTS

| | | | |
|---|---|---|---|
| 4,462,224 A | 7/1984 | Dunshee et al. | |
| 5,570,588 A | 11/1996 | Lowe | |
| 5,820,268 A | 10/1998 | Becker et al. | |
| 2003/0232895 A1* | 12/2003 | Omidian ............... | C08F 220/06 521/99 |

FOREIGN PATENT DOCUMENTS

| | | |
|---|---|---|
| WO | 2014/169119 A1 | 10/2014 |
| WO | WO-2014/169119 A1 | 10/2014 |
| WO | 2015/011211 A1 | 1/2015 |
| WO | WO-2015/011211 | 1/2015 |

OTHER PUBLICATIONS

"Calcium Chloride Handbook," The Dow Chemical Company, Aug. 2003, 28 pgs.
Marler, "Lunch Box Gel Packs Could Leak," Food Safety News, Jan. 25, 2012 [online], [retrieved on Feb. 26, 2018]. Retrieved from the Internet <URL <http://www.foodsafetynews.com/2012/01/lunch-box-gel-packs-could-leak/#.WpQuxqjwaCp>>.
Shazly, et al., "High strain-rate behavior of ice under uniaxial compression," Intl. Solids and Structures, 46, 1499-1515 (2009) 1 page.
International Search Report issued in corresponding International Application No. PCT/US16/49994, dated Nov. 7, 2016, 2 pages.
Written Opinion of the International Searching Authority issued in corresponding International Application No. PCT/US16/49994, dated Nov. 7, 2016, 6 pages.

(Continued)

*Primary Examiner* — Robert D Harlan
(74) *Attorney, Agent, or Firm* — Wilmer Cutler Pickering Hale and Dorr LLP

(57) ABSTRACT

Hydrogel compositions, and corresponding methods of making, are provided. The hydrogels do not freeze, or only partially freeze, over a wide range of temperatures below the freezing temperature of water. Concurrently, these hydrogels also retain their room temperature mechanical properties (e.g., strength, modulus, elasticity) over a wide range of temperatures, including temperatures below the freezing temperature of water. The hydrogels are synthesized by adding a suitable amount of a salt together with previously cross-linked polymer gel. Hydration of the gel with aqueous solutions containing the prescribed salts not only depresses the hydrogel freezing point but protects the structure. For example, the salts do not allow the hydrogel to completely freeze, thus protecting the hydrogel from brittle failure. Whether the hydrogels partially freeze or remain non-frozen when chilled below the freezing temperature of water is determined by concentration of salt within the hydrogel.

28 Claims, 19 Drawing Sheets

(56) References Cited

OTHER PUBLICATIONS

Beebe et al., "Functional hydrogel structures for autonomous flow control inside microfluidic channels," Nature, Apr. 6, 2000, vol. 404, pp. 588-590.
Block, "To Freeze or Not to Freeze? Invertebrate Survival of Sub-Zero Temperatures." Functional Ecology, Jan. 1991, vol. 5, No. 2, pp. 284-290.
Calvert, "Hydrogels for Soft Machines," Advanced Materials, Feb. 6, 2009, vol. 21, 743-756.
Conde, "Properties of aqueous solutions of lithium and calcium chlorides: formulations for use in air conditioning equipment design," International Journal of Thermal Sciences, Apr. 2004, vol. 43, issue 4, pp. 367-382.
Conde-Petit, Manual R., "Aqueous Solutions of Lithium and Calcium Chlorides: Property Formulations for Use in Air Conditioning Equipment Design," M. Conde Engineering, 2014, 31 pages. (http:// http://www.mrc-eng.com/Downloads/Aqueous%20LiCl&CaCl2%20Solution%20Props.pdf).
Duman et al., "Adaptations of Insects to Subzero Temperatures," The Quarterly Review of Biology, Dec. 1991, vol. 66, No. 4, pp. 387-410.
GelCool Systems, GelCool Military Products. (http://www.gelcool.com/military_page.html). Available online Feb. 14, 2009. 2 pages.
Glen, "The creep of polycrystalline ice," Proceedings of the Royal Society of London, Series A, Mathematical and Physical Sciences, vol. 228, pp. 519-538, Mar. 22, 1955.
Illeperuma et al., "Force and stroke of a hydrogel actuator," Soft Matter, Sep. 2013, vol. 9, pp. 8504-8511.
International Search Report and Written Opinion dated Nov. 7, 2016, in the International Application No. PCT/US16/49994. 8 pages.
Keplinger et al., "Stretchable, Transparent, Ionic Conductors," Science, Aug. 30, 2013, vol. 341, 984-987.
Langer, "Drug delivery and targeting," Nature, Apr. 30, 1998, vol. 392, pp. 5-10.
Lee et al., "Hydrogels for Tissue Engineering," Chemical Reviews. Jul. 2001, vol. 101, No. 7, pp. 1869-1879.
Li et al., "Hybrid Hydrogels with Extremely High Stiffness and Toughness," ACS Macro Letters, May 19, 2014, vol. 3, pp. 520-523.
Marler, "Lunch Box Gel Packs Could Leak," Food Safety News, Jan. 25, 2012. 2 pages. (http://www.foodsafetynews.com/2012/01/lunch-box-gel-packs-could-leak/).
Shazly et al. "High strain-rate behavior of ice under uniaxial compression," International Journal of Solids and Structures, Mar. 15, 2009, vol. 46, Issue 6, pp. 1499-1515.
Sun et al., "Ionic skin," Advanced Materials, Oct. 29, 2014, vol. 26, No. 45. 24 pages.
Swenson et al., "Cryotherapy in sports medicine," Scandinavian Journal of Medicine and Science in Sports, Aug. 1996, vol. 6, pp. 193-200.

* cited by examiner

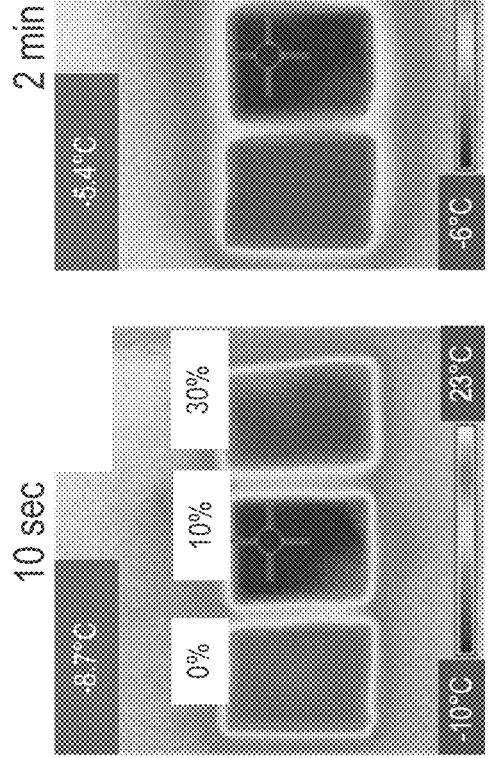
FIG. 11B
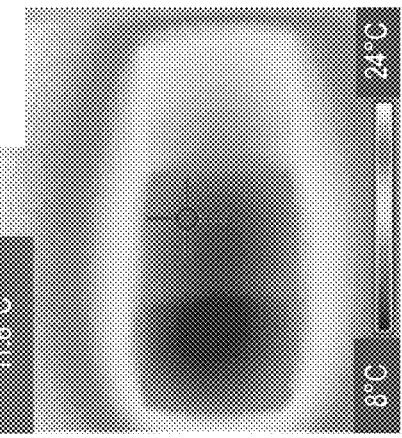
FIG. 11C
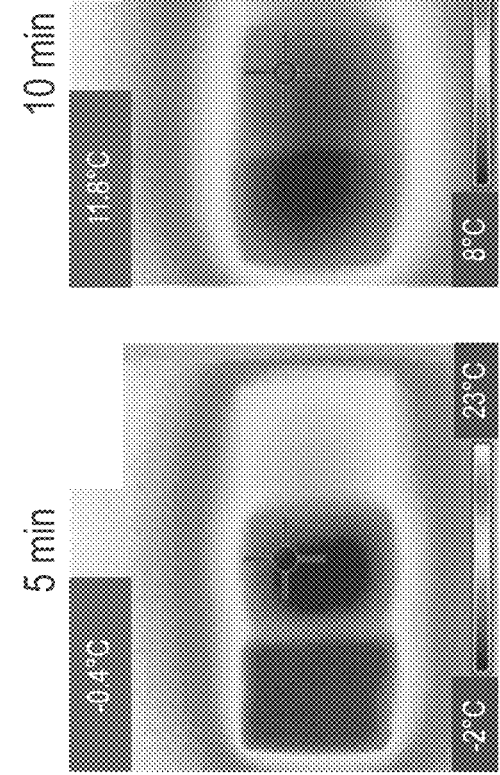
FIG. 11D
FIG. 11E

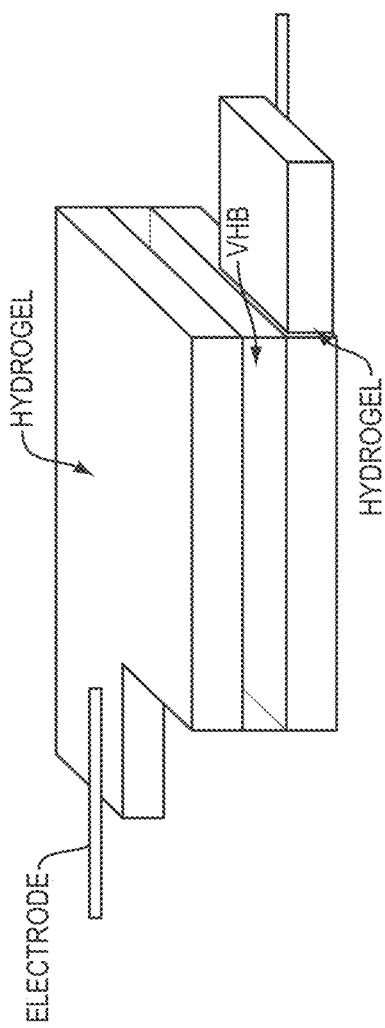

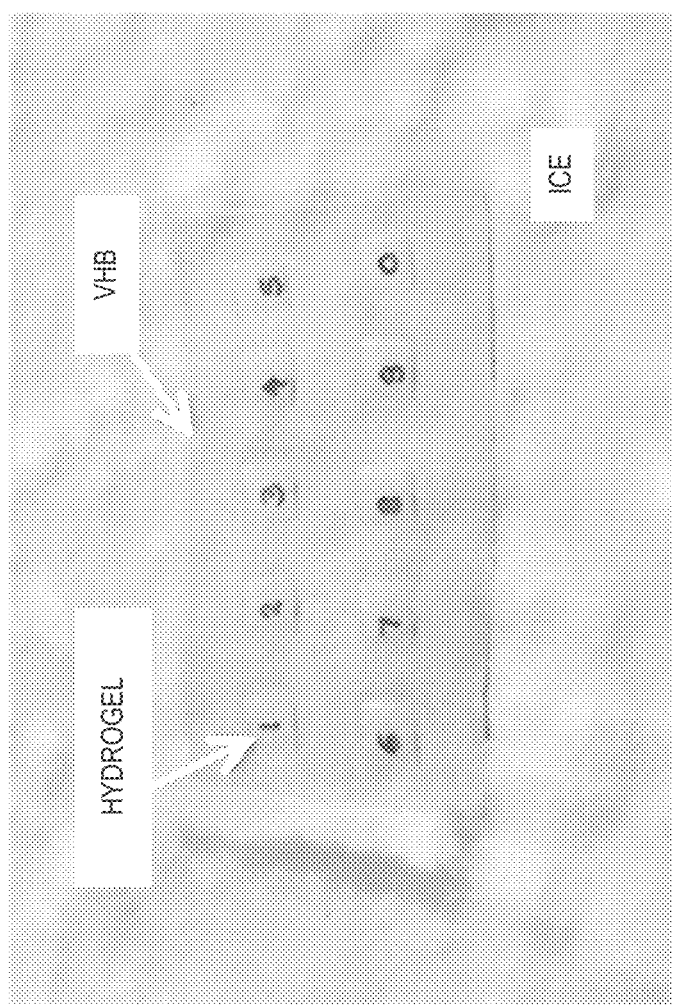

HYDROGELS WITH IMPROVED MECHANICAL PROPERTIES BELOW WATER FREEZING TEMPERATURE

CROSS-REFERENCE TO RELATED APPLICATIONS

This application is the U.S. National Stage Application of International Application No. PCT/US2016/049994, filed Sep. 1, 2016, and entitled "Hydrogels With Improved Mechanical Properties Below Water Freezing Temperature." International Application No. PCT/US2016/049994 claims the benefit of priority of U.S. Provisional Application No. 62/212,961, filed on Sep. 1, 2015, and entitled "Hydrogels With Below Water Freezing Temperature," the entirety of which is hereby incorporated by reference.

STATEMENT AS TO RIGHTS TO INVENTIONS MADE UNDER FEDERALLY SPONSORED RESEARCH AND DEVELOPMENT

This invention was made with Government support under Grant No. CMMI-1404653 awarded by the National Science Foundation and under Grant No. DMR-0820484 awarded by the National Science Foundation. The Government has certain rights to this invention.

TECHNICAL FIELD

The subject matter described herein relates to hydrogels.

BACKGROUND

Hydrogel materials are composed of three-dimensional, cross-linked networks of hydrophilic polymer chains dispersed in water. The water is retained within void spaces of the network due to surface tension effects. As a result, while the volume of water within a hydrogel is significantly greater than the volume of the polymer, the cross-linked polymer network inhibits flow of the hydrogel and the hydrogel exhibits solid-like behavior.

Hydrogels are traditionally studied for biomedical applications such as scaffolds in tissue engineering (Lee and Mooney, D. J., "Hydrogels for tissue engineering," *Chem. Rev.* 101, 1869-1879 (2001)), carriers for drug delivery (Langer, "Drug delivery and targeting," *Nature*, 392, 5-10 (1998), and valves in microfluidic devices (Beebe, et al., "Functional hydrogel structures for autonomous flow control inside microfluidic channels," *Nature*, 404, 588-590 (2000)). Notably, hydrogels can mimic the elastic behavior of natural soft tissue due to their high water content and solid character. Furthermore, hydrogels are generally biocompatible and demonstrate good permeability to oxygen and other water-soluble compounds.

Notably, however, mechanical properties of hydrogels are relatively poor. In one aspect, hydrogels exhibit low mechanical strength due to the random alignment of polymer chains within the three-dimensional polymer network and the high water content. Furthermore, hydrogels tend to exhibit brittle (i.e., catastrophic) fracture, with little to no plastic deformation. These poor mechanical properties limit the scope of hydrogels for use in the above-referenced applications (Calvert, "Hydrogels for Soft Machines," *Adv. Mater.* 21, 743-756 (2009)).

The mechanical properties of hydrogels are further degraded when their temperature falls below the freezing temperature of water. For example, under these conditions, the water inside the hydrogel polymer network solidifies and the hydrogel ceases to exhibit appreciable elastic behavior. Thus, at temperatures below the freezing point of water, hydrogels exhibit mechanical properties similar to ice.

Accordingly, there is an ongoing need for hydrogels possessing improved mechanical properties, particularly at temperatures below the freezing point of water.

SUMMARY

The compositions and methods of the disclosed embodiments solve the problems and shortcomings of earlier hydrogels, particularly at low, e.g., temperature below the freezing point of water.

Conventional hydrogels contain mostly water, and they freeze when the temperature drops below 0° C. As a result, they become brittle and lose the ability to undergo significant elastic or plastic deformation prior to fracture, rendering them unsuitable for their intended application. Embodiments of the present disclosure present a new class of hydrogels that do not freeze or hydrogels that partially freeze below water freezing temperature while retaining the structural and mechanical integrity of the gel. Hydrogels are synthesized by adding a suitable amount of salt together with previously cross-linked polymer hydrogels. Whether the hydrogels are partially frozen or non-frozen is determined by the added salt concentration and environment temperature. The freeze-resistant hydrogels are strong and flexible over a wide range of temperatures. For example Polyacrylamide-alginate hydrogel prepared at room temperature that contains a 30 wt % (weight of solute/weight of solvent) Calcium Chloride, allows the hydrogel to maintain the mechanical properties without freezing even down to a temperature of −50° C. Partially freezing hydrogels can be ideal for cooling applications such as gel packs and non-freezing hydrogels can be useful in ionic devices and soft robotics at low temperatures.

Accordingly, a freeze-resistant hydrogel composition includes a gel including an acrylamide-alginate copolymer; at least 50% water; and a hygroscopic compound such as a hygroscopic divalent or trivalent salt. In an embodiment of the hydrogel composition, the salt is present at a concentration of 0.1-5M. In some implementations, the salt is present at concentrations of 0 or 0.1-2.7M.

In an embodiment of the hydrogel composition, the divalent salt is selected from the group consisting of calcium chloride ($CaCl_2$), magnesium chloride ($MgCl_2$), copper(II) chloride ($CuCl_2$), zinc chloride ($ZnCl_2$), Calcium Oxide (CaO), Magnesium Oxide (MgO), Barium Oxide (BaO), magnesium sulfate ($MgSO_4$), sodium sulfate ($Na_2SO_4$), calcium sulfate ($CaSO_4$), copper(II) sulfate ($CuSO_4$), potassium carbonate ($K_2CO_3$), sodium carbonate ($Na_2CO_3$).

In an embodiment of the hydrogel composition, the trivalent salt is selected from the group consisting of: aluminum trichloride ($AlCl_3$), gallium trichloride ($GaCl_3$, $Ga_2Cl_6$), iron(III) chloride ($FeCl_3$), indium trichloride ($InCl_3$), cerium chloride ($CeCl_3$), cerium trifluoromethanesulfonate ($Ce(OTf)_3$), lanthanide chloride ($LaCl_3$), lanthanide trifluoromethanesulfonate ($La(OTf)_3$), ytterbium chloride ($YbCl_3$), and ytterbium trifluoromethanesulfonate ($Yb(OTf)_3$).

In some examples, the salt has a concentration selected within the range from 0.1 wt % (weight of solute/weight of solvent) and 50 wt. %. In some examples, the salt a concentration of about 0 wt. %, 5 wt. %, 10 wt. %, 15 wt. %, 20 wt. %, 25 wt. %, or 30 wt. %.

In still other embodiments, a freeze-resistant composition comprises an organic hygroscopic substance or compound. In certain embodiments, the organic hygroscopic substance substitutes for a divalent and/or trivalent salt as described in any of the embodiments described herein. In other embodiments, a freeze-resistant composition comprises an organic hygroscopic substance and a divalent and/or trivalent salt in any of the embodiments described herein. Exemplary organic hygroscopic substances include: glycols (e.g., butylene glycol, triethylene glycol, or propylene glycol), polyols (e.g., glycerol), saccharides (e.g., monosaccharides such as fructose, glucose, and mannose; disaccharides such as maltose, sucrose, and lactose; and polysaccharides such as cellulose, pectins, and maltodextrin); and amines (e.g., alkanolamines such as ethanolamine, aminopropanol, or aminobutanol).

In an embodiment of the hydrogel composition, the salt includes a mixture of a divalent salt and a trivalent salt, where the divalent salt includes calcium chloride, magnesium chloride, zinc chloride, or copper chloride and where the trivalent salt includes aluminum trichloride, gallium trichloride, ferrous trichloride, or indium trichloride.

In an embodiment of the hydrogel composition, the hydrogel includes a cross-linked network of hydrophilic polymer chains dispersed in water in which the salt has been dissolved. For example, the polymer chains include polyacrylamide and/or alginate; and the cross-links include N,N-methylenebisacrylamide and/or calcium sulfate.

In an embodiment of the hydrogel composition, the hydrogel composition remains elastic at a minimum temperature less than the freezing temperature of water and greater than or equal to the eutectic temperature of the salt-water phase diagram.

In an embodiment, a gel package is provided. The gel package includes the hydrogel composition and further includes a seal for encapsulating the hydrogel composition.

In an embodiment, a soft actuator including the hydrogel composition is provided.

In an embodiment, an ionic sensor is provided. The ionic sensor includes two layers including the hydrogel composition, a layer of a dielectric elastomer between the two hydrogel layers, and two electrodes, where each layer of the hydrogel coupled to a respective one of the two electrodes.

The hydrogel composition of embodiment of the disclosure may possess a freezing point below 0° Celsius and retain physical, mechanical, structural integrity even at such low temperatures. Beneficially, the salts not only depress the freezing point of the water in the hydrogels but preserve the mechanical properties of the cross-linked polymeric structure.

In an embodiment, a method of producing a low-freezing point hydrogel is provided. The method includes forming a gel having a cross-linked network of hydrophilic polymer chains dispersed in water; and immersing the gel in a salt solution. Forming the hydrogel may further include dissolving the hydrophilic polymer in water, adding one or more cross-linking compositions to the water to create a solution, and curing the solution to form the hydrogel.

In an embodiment of the method, the at least one cross-linking compound includes calcium sulfate and/or N,N-methylenebisacrylamide.

In an embodiment, the method further includes adding an initiator including ammonium persulfate and an accelerator including N,N,N',N'-tetramethylethylenediamine.

In an embodiment of the method, the salt is a divalent salt selected from the group consisting of calcium chloride ($CaCl_2$), magnesium chloride ($MgCl_2$), copper(II) chloride ($CuCl_2$), zinc chloride ($ZnCl_2$), Calcium Oxide (CaO), Magnesium Oxide (MgO), Barium Oxide (BaO), magnesium sulfate ($MgSO_4$), sodium sulfate ($Na_2SO_4$), calcium sulfate ($CaSO_4$), copper(II) sulfate ($CuSO_4$), potassium carbonate ($K_2CO_3$), sodium carbonate ($Na_2CO_3$).

In an embodiment of the method, the trivalent salt is selected from the group consisting of: aluminum trichloride ($AlCl_3$), gallium trichloride ($GaCl_3$, $Ga_2Cl_6$), iron(III) chloride ($FeCl_3$), indium trichloride ($InCl_3$), cerium chloride ($CeCl_3$), cerium trifluoromethanesulfonate ($Ce(OTf)_3$), lanthanide chloride ($LaCl_3$), lanthanide trifluoromethanesulfonate ($La(OTf)_3$), ytterbium chloride ($YbCl_3$), and ytterbium trifluoromethanesulfonate ($Yb(OTf)_3$).

In an embodiment of the method, the salt has a concentration of between 0.1 wt. % (weight of solute/weight of solvent) and 50 wt. %.

In an embodiment, the salt has a concentration of about 10 wt. %, 20 wt. %, 30 wt. %, or 40 wt. %.

In an embodiment of the method, the polymer chains include polyacrylamide and/or alginate and the cross-links include N,N-methylenebisacrylamide and/or calcium sulfate.

In an embodiment of the method, the hydrogel has a freezing point below 0° Celsius.

In an embodiment of the method, the salt has a concentration at the eutectic point of the salt-water phase diagram.

In an embodiment of the method, the hydrogel exhibits a freezing point less than the freezing temperature of water and greater than or equal to the eutectic temperature of the salt-water phase diagram.

In the example of a polyacrylamide-alginate copolymer hydrogel, the salt includes a divalent or trivalent salt, e.g., Calcium Chloride. The concentrations of salt in the salt solution are as described herein.

In some examples, the hydrogel is made from polymers that do not include alginate. In such cases, a freeze-resistant composition includes a hydrogel including an acrylamide polymer in the absence of an alginate, at least 50% water, and a hygroscopic monovalent, divalent or trivalent salt. For example, the monovalent salt may be selected from the group consisting of: sodium chloride, lithium chloride, and potassium Chloride.

The freeze-resistant hydrogels are ideally suited for a variety of industrial, consumer, and medical applications and have significant advantages over conventional gels that become brittle, stiff, and non-functional blow the freezing point of water.

For example, embodiments of the compositions include a gel package including the composition described above, and the gel package optionally includes a seal for encapsulating hydrogel;

In an embodiment, a soft actuator including the hydrogel composition is provided.

In an embodiment, an ionic sensor is provided. The ionic sensor includes two layers including the hydrogel composition, a layer of a dielectric elastomer between the two hydrogel layers, and two electrodes, where each layer of the hydrogel is coupled to a respective one of the two electrodes.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIGS. 11B-11E are time lapse thermal images of three polyacrylamide-alginate hydrogels containing different concentrations of $CaCl_2$ immediately after removing from a −11° C. freezer; (B) 10 s; (C) 2 min; (D) 5 min; (E) 10 min;

FIG. 12A is a schematic illustration of an ionic skin sensor including sandwiching a layer of dielectric between two layers of a polyacrylamide-alginate hydrogel containing 30 wt. % $CaCl_2$ connected to two electrodes.

FIG. 13 illustrates a hydrogel keypad formed from a polyacrylamide-alginate hydrogel containing $CaCl_2$ and placed on ice as a demonstration of a touch sensor operating at low temperature.

DETAILED DESCRIPTION

Figure 1A:
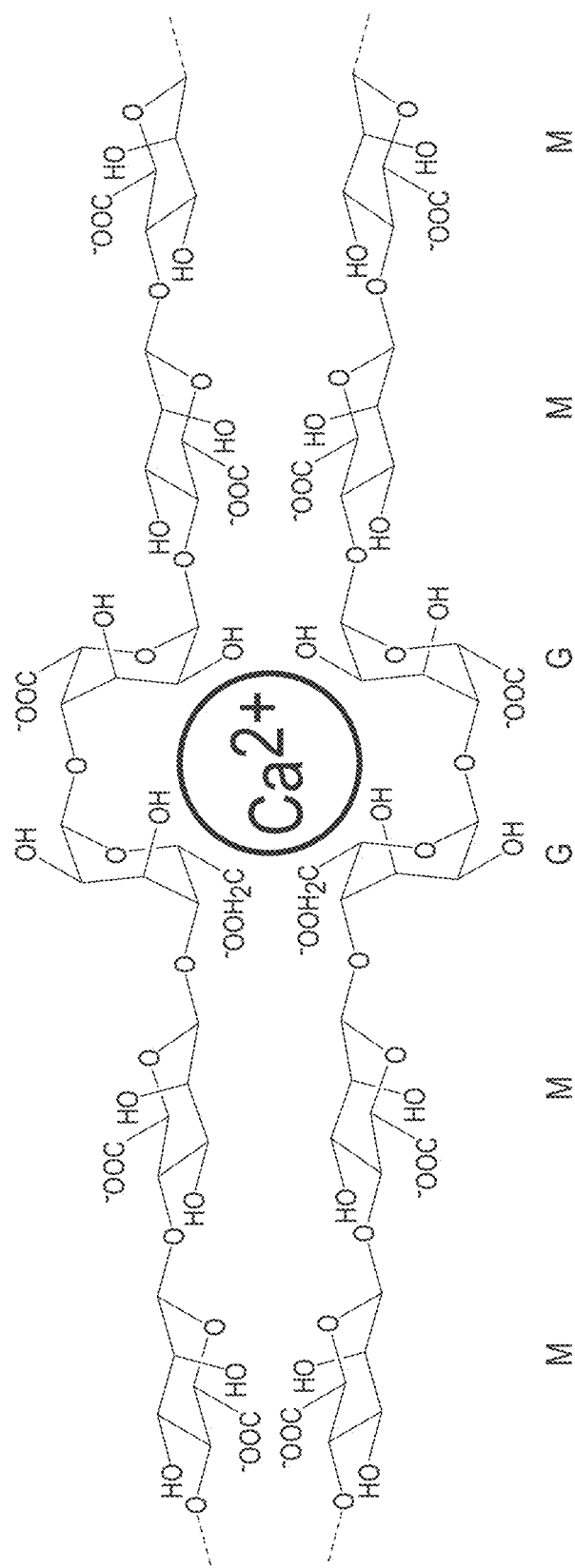
FIG. 1A is a schematic illustration of the chemical structure of an alginate gel.

Embodiments of the present disclosure address the shortcomings of conventional hydrogels by providing compositions, and corresponding methods of making, a new class of hydrogels that do not freeze, or only partially freeze, over a wide range of temperatures below the freezing temperature of water. As a result, the improved hydrogel compositions described herein expand the range of uses for hydrogels at extreme temperatures, not feasible with conventional hydrogels. Concurrently, these hydrogels also retain their room temperature mechanical properties (e.g., strength, modulus, and elasticity) over a wide range of temperatures, including sub-zero temperatures.

As described in greater detail below, certain embodiments of the disclosed hydrogels are synthesized by adding of a suitable amount of a salt together with previously crosslinked polymer. Hydration of polymer gels with aqueous solutions containing embodiments of the disclosed salts not only depresses freezing point of the resultant hydrogel but protects the structure of the polymeric hydrogel as well. For example, in certain embodiments, the salts do not allow the hydrogel to completely freeze, thus protecting the hydrogel from brittle failure. Whether the hydrogels partially freeze, or remain non-frozen when chilled below the freezing temperature of water, is determined by the chemical composition of the salt, the added salt concentration, and the environment temperature (relative to a given relative humidity).

For example, partially frozen and non-frozen hydrogels have been developed based on the phase diagram of the calcium chloride-water system. As discussed in greater detail below, polyacrylamide-alginate hydrogels have been prepared at room temperature that contain 10 wt. % to 30 wt. % (weight of solute/weight of solvent) calcium chloride ($CaCl_2$). The compositions are strong (e.g., some implementations have a modulus ~0.1 MPa at zero degrees Celsius) and flexible (e.g., some implementations have a compression strain greater than 50% at zero degrees Celsius) in a wide range of temperatures. A 10 wt. % $CaCl_2$-hydrogel has been observed to only partially freeze at temperatures below the freezing point of water, while retaining its room temperature mechanical properties. Furthermore, a 30 wt. % $CaCl_2$-hydrogel has been shown to maintain its room temperature mechanical properties without freezing even down to a temperature of −50° C.

These attributes confer significant and surprising advantages over polymeric hydrogels hydrated with aqueous solutions lacking the specified salts. Notably, this new class of hydrogels can be useful in many low temperature applications in which conventional hydrogels are unsuitable.

One example application is gel packs. Gel packs are used to keep food cool in portable coolers, relieve muscle pain, and insulate shipping containers to keep products cool during transportation (Lowe, "Freezable insert cooler," U.S. Pat. No. 5,570,588; Swenson, et al., "Cryotherapy in sports medicine," *Scand. J. Med. Sci. Sports*, 6, 193-200, (1996); Becker and Toro, "Insulated container for packaging perishable goods," U.S. Pat. No. 5,820,268). Conventional gel packs are made with a mixture of water, propylene glycol and hydroxypropyl methylcellulose (Dunshee and Chang, "Instant hot or cold, reusable cold pack," U.S. Pat. No. 4,462,224). Mechanically, they are soft and compliant at room temperature and remain malleable or hard when frozen. These packs can absorb considerable amount of heat before warming above 0° C. due to their high latent heat of fusion of water. However, current gel packs contain the gels in the form of viscous liquid and they need many compartments to avoid flowing. There have been reported some incidents of gel packs in which compartments have broken and leaked the cooling gel, which has further mixed with food and have become poisonous.

In an example application of embodiments of the hydrogels discussed herein, a partially frozen, tough hydrogel represents an improvement over such conventional gel packs. For example, partially frozen hydrogels according to embodiments of the present disclosure exhibit a high heat of fusion of water, superior to conventional gel packs. Furthermore, the partially frozen hydrogels provide enhanced mechanical durability when subjected to loading, inhibiting flow of the hydrogel content inside the pack. Thus, the hydrogel compositions described herein may be employed as an improved replacement for conventional gel packs in cooling applications.

Gel packs employing freeze resistant hydrogels may also be used in military applications, such as cooling helmets and gel vests for soldiers in extreme hot weather. The strength and toughness of the gels are advantageous military applications, where the gel packs are expected to retain their functionality under adverse conditions (e.g., high stress, varying temperature).

Furthermore, because embodiments of the freeze resistant hydrogels contain mostly water and salt, they can be made with very low cost and can also be useful as cooling jackets for workers near furnaces, gel hats or jackets to be used in extreme hot weather.

In a further example, non-freezing hydrogels according to embodiments of the present disclosure can also be employed in ionic devices and soft robotics at low temperatures. Stretchable and transparent ionic devices made of hydrogels and dielectric elastomers have been recently developed (Keplinger, et al., "Stretchable, Transparent, Ionic Conductors," *Science*, 341, 984-987 (2013); Sun, et al., "Ionic skin," *Adv. Mater.* 26, 7608-7614 (2014)). Hydrogels have also been studied as soft actuators (Illeperuma, et al., "Force and stroke of a hydrogel actuator," *Soft Matter*, 9, 8504-8511 (2013)). However, these ionic devices and soft robotics generally exhibit impaired function, or cease to function, if the water inside the hydrogel freezes. Accordingly, also demonstrated herein is a touch sensing ionic device that functions without difficulty at below water freezing temperatures.

Further applications of embodiments of the disclosed hydrogels may include, but are not limited to, soft contact lenses, catheter coatings, wound dressings, drug delivery, tissue engineering, cell encapsulation, and nanoparticle coatings.

Hydrogel Design

A discussion of design considerations for embodiments of the hydrogel compositions follows below. In an embodiment, the hydrogel is a hybrid, including a three-dimensional network of two polymer gels intertwined together. One of the gels is natural, alginate, also referred to as alginic acid, and the other gel is synthetic, polyacrylamide.

Figure 1B:
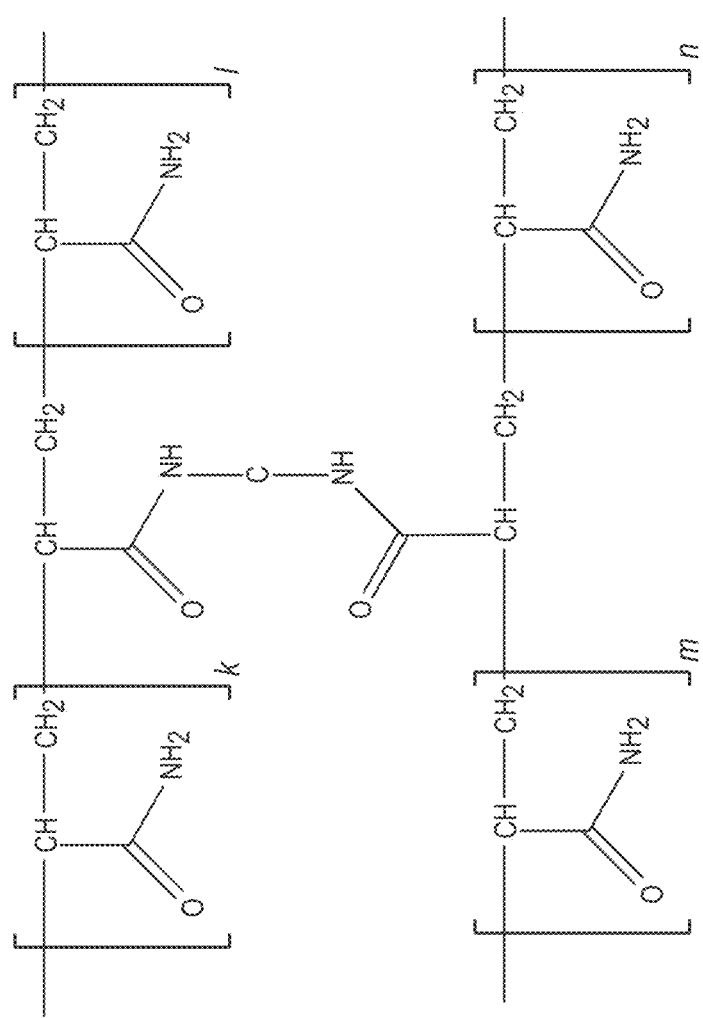
FIG. 1B is a schematic illustration of the chemical structure of a polyacrylamide gel.
Figure 1C:
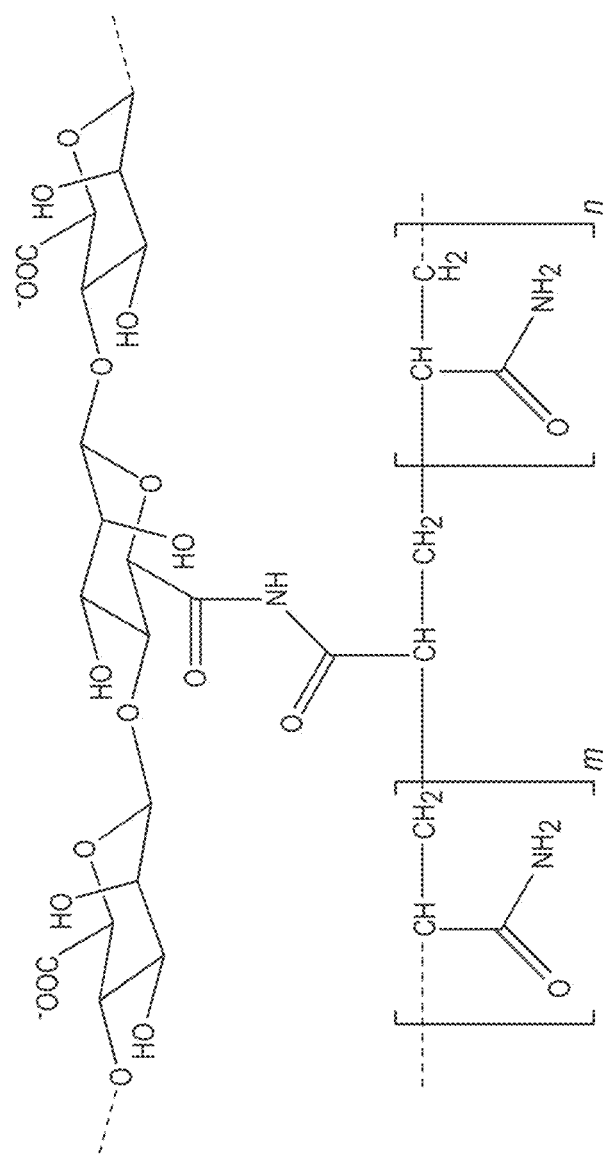
FIG. 1C is a schematic illustration of the chemical structure of a cross-linked polyacrylamide-alginate gel.

The alginate gel is illustrated in FIG. 1A, while the polyacrylamide gel is illustrated in FIG. 1B. Alginic acid is a linear copolymer of the formula $(C_6H_8O_6)_n$. It includes homopolymeric blocks of (1-4)-linked β-D-mannuronate (designated "M-blocks") and its C-5 epimer, α-L-guluronate (designated "G-blocks"). In the alginate gel, the G blocks on different alginate polymer chains form ionic crosslinks through a cation (e.g., $Ca^{2+}$). In the polyacrylamide gel, the polymer chains form covalent cross-links through N,N-methylenebisacrylamide (MBAA; $C_7H_{10}N_2O_2$). In the alginate-polyacrylamide hybrid gel (FIG. 1C), the two polymer networks are joined by covalent cross-links between amine groups on the polyacrylamide and carboxyl groups on the alginate chains.

Figure 3C:
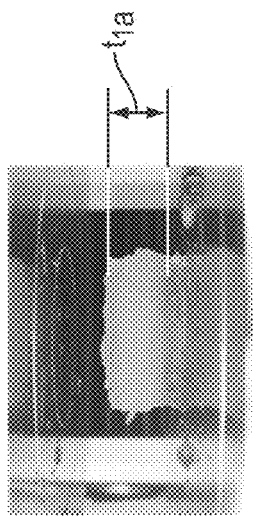
FIGS. 3A-3C are photographs illustrating the behavior of a brittle polyacrylamide-alginate hydrogel under compression at a temperature of −20° C.
Figure 3B:
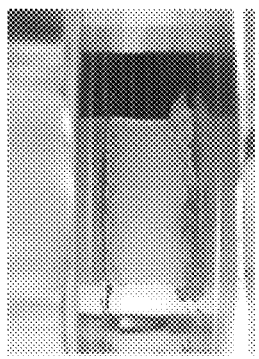
Figure 3A:
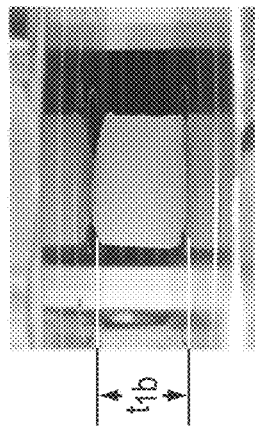

Hydrogels of the polyacrylamide-alginate hybrid exhibit high toughness resulting from a synergy of two mechanisms, crack bridging by the covalently bonded polyacrylamide network and energy dissipation by unzipping the ionic crosslinks in the alginate network over a large region of the hydrogel (Li, et al., "Hybrid Hydrogels with Extremely High Stiffness and Toughness," *ACS Macro Letters*, 3, 520-523 (2014)). However, when the polyacrylamide-alginate hydrogel is stored at −20° C., it freezes, becoming similar to ice. With reference to the compression test of FIGS. 3A-3C, under these water freezing conditions, the polyacrylamide-alginate hydrogel becomes brittle and loses its reversible elastic character. As a result, the frozen polyacrylamide-alginate hybrid fractures under compressive load and deformation is not recoverable (i.e., the sample thickness before compression, $t_{1b}$ is greater than the sample thickness after compression, $t_{1a}$).

Freezing point depression is a process by which a solute is added to a solvent to decrease the freezing point of the solution. For example, salt is added to roads during winter to avoid any ice formation on roads. Antifreeze liquids are mixed with water to be used in radiators that do not freeze in winter. This method is also used by organisms that live in extreme cold weather where they produce antifreeze agents to decrease the freeze point of water inside them (Block, W., "To Freeze or Not to Freeze?", *Invertebrate Survival of Sub-Zero Temperatures. Functional Ecology*, Vol. 5, No. 2, 284-290 (1991); Duman, et al., "Adaptations of Insects to Subzero Temperatures," *The Quarterly Review of Biology*, vol. 66, no. 4 (1991)). They do not freeze solid even the water freezes outside. When salt is added to pure water the freezing point of water can greatly be reduced.

Salts are ionic compounds that result from the neutralization reaction of an acid and a base. They are composed of related numbers of cations (positively charged ions) and anions (negative ions) so that the product is electrically neutral (without a net charge). These component ions can be inorganic, such as chloride ($Cl^-$), or organic, such as acetate ($C_2H_3O$—); and can be monatomic, such as fluoride ($F^-$), or polyatomic, such as sulfate ($SO_4^{2-}$). There are several varieties of salts. Salts that hydrolyze to produce hydroxide ions when dissolved in water are basic salts, whilst those that hydrolyze to produce hydronium ions in water are acidic salts. Neutral salts are those that are neither acid nor basic salts.

However, simple freezing point depression alone cannot solve the problem of hydrogel performance at low temperatures, e.g., below 0° C. Notably, the selection of the proper salt and salt concentration in the hydration solution is necessary to preserve the room temperature (e.g., approximately 20-25 C) mechanical properties of the hydrogel while also providing freezing point suppression. For example, when certain monovalent salts (e.g., LiCl, NaCl) are used, they can replace the $Ca^{2+}$ ionic cross-links in the alginate network, removing the energy dissipation mechanism provided by the ionic cross-links and producing a hybrid hydrogel with poor mechanical properties (i.e., brittle and weak).

In contrast, embodiments of the disclosed polyacrylamide-alginate hydrogels include a polyacrylamide-alginate copolymer gel, at least 50% water, and a bivalent and/or trivalent salt in a concentration selected from the range of 0.1 wt. % to 50 wt. % on the basis of the weight of the solute to the weight of the solvent. In certain embodiments, the salt concentration is selected from the range of 0 wt. %, 10 wt. %, 20 wt. %, 30 wt. %, and 40 wt. %. In further embodiments, the salt concentration is selected from the range of 10 wt. % to 30 wt. %. In alternative embodiments, the salt concentration is selected from the range of 0.1M to 5M. In further embodiments, the salt concentration is selected from the range of 0.1M to 2.7M. In certain embodiments, the salt concentration is 0.

In an embodiment, the salt is one or more monovalent, divalent salts, or trivalent salts, as discussed below. In general, the choice of salt and salt concentration will dictate the temperature range over which the hydrogel remains liquid or partially frozen, allowing the hydrogel to be tailored to a given application. For example, the lowest freezing temperature of a salt-containing hydrogel depends on the eutectic point of the salt-water phase diagram (the composition at which the liquid-solid phase transition temperature is lowest). For example, when a hydrogel is prepared containing the salt calcium chloride ($CaCl_2$) in a concentration equal to its eutectic concentration (i.e., 30° C.; see, e.g., FIG. 5A), its temperature can be reduced to its eutectic temperature (for this example its −50° C.) without freezing. Similarly, if LiCl is employed as the salt instead of $CaCl_2$, in a concentration equal to its eutectic concentration (i.e., 25 wt. % LiC), its temperature may be reduced to its eutectic temperature, which is even lower than $CaCl_2$ (i.e., −75° C.).

Embodiments of the divalent salt may include combinations of divalent anions and divalent cations, monovalent cations and divalent anions, or divalent cations and monovalent anions. Examples of divalent cations for divalent salts may include, but are not limited to, barium ($Ba^{2+}$), calcium ($Ca^{2+}$), copper (II) ($Cu^{2+}$), magnesium ($Mg^{2+}$), and zinc ($Zn^{2+}$). Examples of divalent anions for divalent salts may include, but are not limited to, oxides ($O^{2-}$) and sulfates ($SO_4^{2-}$). Examples of monovalent cations for divalent salts may include, but are not limited to, lithium ($Li^+$), potassium ($K^+$), and sodium ($Na^+$). Examples of monovalent anions for divalent salts may include, but are not limited to, chlorides ($Cl^-$).

In further embodiments, the divalent salts include, but are not limited to, calcium chloride ($CaCl_2$), magnesium chloride ($MgCl_2$), copper(II) chloride ($CuCl_2$), zinc chloride ($ZnCl_2$), Calcium Oxide (CaO), Magnesium Oxide (MgO), Barium Oxide (BaO), magnesium sulfate ($MgSO_4$), sodium sulfate ($Na_2SO_4$), calcium sulfate ($CaSO_4$), copper(II) sulfate ($CuSO_4$), potassium carbonate ($K_2CO_3$), sodium carbonate ($Na_2CO_3$).

In an embodiment, the salt is one or more trivalent salts. The trivalent salt may include combinations of a trivalent anion and a monovalent cation. Examples of trivalent cations for trivalent salts may include, but are not limited to, aluminum ($Al^{3+}$), indium ($In^{3+}$), gallium ($Ga^{3+}$), iron(III) ($Fe^{3+}$), and lanthanides (e.g., cerium ($Ce^{3+}$), lanthanum(III) ($La^{3+}$), ytterbium(III) ($Yb^{3+}$). Examples of monovalent anions for trivalent salts may include, but are not limited to, chloride ($Cl^-$) and trifluoromethanesulfonate ($CF_3SO_3^-$), also interchangeably abbreviated as $OTf^-$.

In further embodiments, the trivalent salts may include, but are not limited to, aluminum trichloride ($AlCl_3$), gallium trichloride ($GaCl_3$, $Ga_2Cl_6$), iron(III) chloride ($FeCl_3$), indium trichloride ($InCl_3$), cerium chloride ($CeCl_3$), cerium trifluoromethanesulfonate ($Ce(OTf)_3$), lanthanide chloride ($LaCl_3$), lanthanide trifluoromethanesulfonate ($La(OTf)_3$), ytterbium chloride ($YbCl_3$), and ytterbium trifluoromethanesulfonate ($Yb(OTf)_3$).

In other embodiments, the salt is one or more monovalent salts including a monovalent cation and a monovalent anion. Examples of monovalent cations for monovalent salts may include, but are not limited to, sodium ($Na^+$), lithium ($Li^+$), and potassium ($K^+$). Examples of monovalent anions for monovalent salts may include, but are not limited to, chloride (Cl—). In additional embodiments, the one or more monovalent salts may include, but are not limited to, sodium chloride (NaCl), lithium chloride (LiCl), and potassium chloride (KCl).

In further embodiments, the salt may include a combination of one or more divalent salts and one or more trivalent salts. Exemplary combinations may include, but are not limited to, a divalent salt including at least one of $MgCl_2$, $ZnCl_2$, and $CuCl_2$ and a trivalent salt including at least one of $AlCl_3$, $GaCl_3$, $FeCl_3$, and $InCl_3$.

Notably, however, as discussed above, LiCl might not be suitable for polyacrylamide-alginate hydrogels because $Li^+$ can exchange $Ca^{2+}$ and reduce the toughness. However, with suitable hydrogels, non-freezing hydrogels can be prepared that are strong and flexible even at environments of −75° C.

In further embodiments, an organic hygroscopic compound is substituted for any of the divalent and/or trivalent salts discussed above. Organic hygroscopic substances may include, but are not limited to, glycols (e.g., butylene glycol, triethylene glycol, propylene glycol), polyols (e.g., glycerol), saccharides (e.g., monosaccharides such as fructose, glucose, and mannose; disaccharides such as maltose, sucrose, and lactose; and polysaccharides such as cellulose, pectins, and maltodextrin); and amines (e.g., alkanolamines such as ethanolamine, aminopropanol, or aminobutanol).

Hydrogel Synthesis

In an embodiment, a method of preparing a hydrogel composition includes the following. In a first operation, powders of the alginate and acrylamide are dissolved in water (e.g., deionized water) to form a polymer-water mixture. The relative amounts of alginate, acrylamide, and water may be varied as necessary to achieve desired hydrogel properties. Subsequently, the polymer-water mixture may be agitated until a homogenous polymer-water solution is obtained.

In a second operation, each of the polymers is crosslinked to itself and the other polymer by adding one or more cross-linking compounds, cross-linking initiator compounds, and cross-linking accelerator compounds to the polymer-water solution to form a three-dimensional, cross-linked alginate-polyacrylamide gel. For example, an ionic cross-linking compound may be added for the alginate (e.g., calcium sulfate dihydrate ($CaSO_4.2H_2O$)). The amount of the ionic cross-linking compound may be selected on the basis of the weight of the alginate to achieve a desired level of alginate cross-linking. An initiator for the acrylamide (e.g., an ammonium persulfate photo-initiator) may be added on the basis of the weight of the acrylamide to achieve a desired level of polyacrylamide cross-linking. A cross-linking compound for the acrylamide may be added (e.g., N,N-methylenebisacrylamide) on the basis of the weight of the acrylamide. A compound for cross-linking the alginate and acrylamide may be added (e.g., N,N-methylenebisacrylamide) on the basis of the weight of the acrylamide to achieve a desired level of alginate-polyacrylamide. An accelerator compound for the acrylamide may be added (e.g., N,N,N',N'-tetramethylethylenediamine) on the basis of the weight of the acrylamide.

In a third operation, the solution is poured into a mold and cured. For example, the solution may be exposed to ultraviolet (UV) light source for curing the solution, covalently cross-linking the polymer chains and forming an alginate-polyacrylamide gel. The power density of the UV curing light source and the curing time may be selected to achieve a desired level of cross-linking within the hydrogel.

Following synthesis of the alginate-polyacrylamide hybrid gel, the hybrid gel is immersed in the salt solution to obtain the alginate-polyacrylamide hybrid hydrogel. The salt and salt concentration may be selected as discussed above.

In further embodiment, these hydrogels can absorb water from the environment when the relative humidity is high and can lose water when the relative humidity is low. Thus, for some applications, the hydrogels may be kept sealed after synthesis to maintain constant water content.

For illustration, consider the example of a $CaCl_2$ salt solution. As the concentration of the salt solution is increased, the degree of ionic cross-linking of the alginate changes. Ideally, hydrogels that are not immersed in the salt solution (referred to herein as 0 wt. % polyacrylamide-alginate hydrogels) possess no ionic cross-linking of the alginate, as there is no $Ca^{2+}$ cation in these hydrogels. However, in practice, it is observed that these materials may contains a very low concentration (e.g., 0.3 wt. %) or negligible of $CaSO_4$ in the sample. Since $CaSO_4$ may be used as a cross-linker for some alginate hydrogels, such alginate-based hydrogels may contain a small percentage (e.g., 0.3 wt. %) of salt.

Figure 2A:
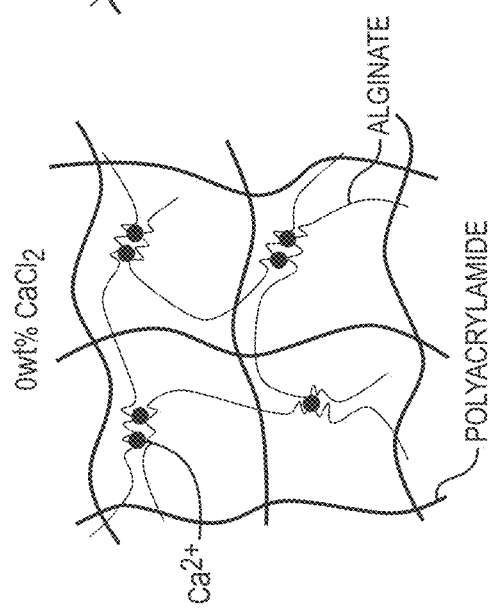
FIGS. 2A-2C are schematic illustrations of the structure of a polyacrylamide-alginate hydrogel containing a $CaCl_2$ salt in different concentrations; (A) 0 wt. %; (B) 10 wt. %; (C) 20 wt. %.
Figure 2B:
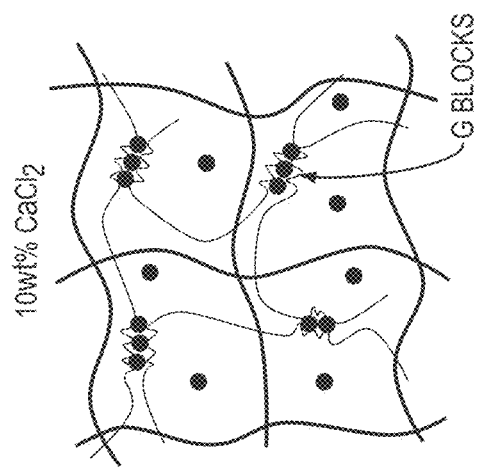
Figure 2C:
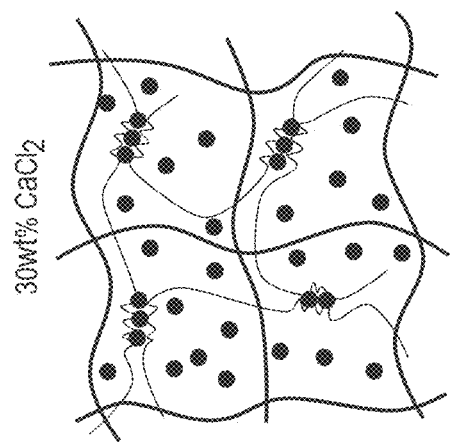

An example of this architecture is shown in FIG. 2A, where the polyacrylamide network is illustrated in dark lines, the alginate network is illustrated in light lines, and $Ca^{2+}$ ions occupied by the G blocks in the alginate network are represented by circles. As the concentration of the salt solution is increased (e.g., from 0 wt. % to 10 wt. % $CaCl_2$), all the G blocks of the alginate chains become fully saturated with $Ca^{2+}$ (Li, et al., "Hybrid hydrogels with extremely high stiffness and toughness," *ACS Macro Letters*, 3, 520-523 (2014)) and the excess $Ca^{2+}$ are mixed with water (FIG. 2B). With a higher $CaCl_2$ solution concentration (e.g., 30 wt. %), all the G blocks are saturated and excessive $Ca^{2+}$ is mixed with water as shown in FIG. 2C.

Figure 4C:
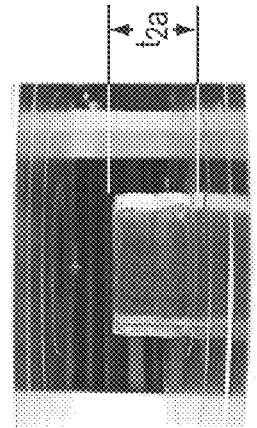
FIGS. 4A-4C are photographs illustrating the behavior of an elastic polyacrylamide-alginate hydrogel containing 30 wt. % $CaCl_2$ under compression at a temperature of −20° C.
Figure 4B:
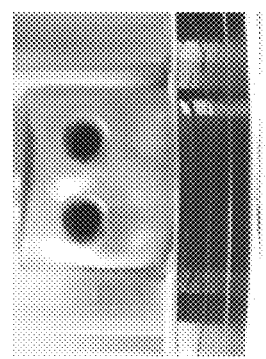
Figure 4A:
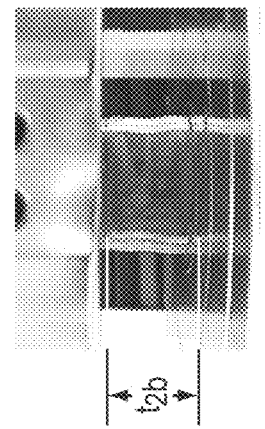

As discussed in greater detail below, by adding $CaCl_2$, polyacrylamide-alginate hybrid hydrogels can be made that are partially frozen or that do not freeze below 0° C., depending upon the amount of Calcium Chloride added and the environment temperature (under conditions of substantially constant relative humidity). For example, as illustrated in FIGS. 4A-4C, a polyacrylamide-alginate hydrogel that contains 30 wt. % $CaCl_2$ stored at −20° C. does not freeze and its deformation is fully recovered when compressed (i.e., the sample thickness before compression, $t_{2b}$ is equal than the sample thickness after compression, $t_{2a}$). This behavior is in marked contrast to the 0 wt. % $CaCl_2$ polyacrylamide-alginate hydrogel, discussed above with respect to FIGS. 3A-3C, which was brittle and lost its reversible elastic character.

Figure 5B:
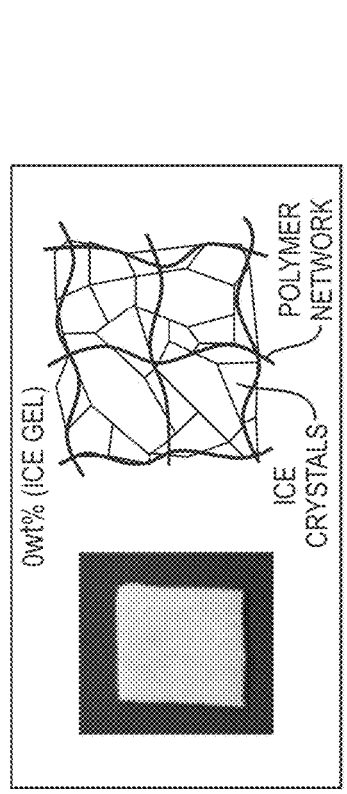
FIGS. 5B-5D are schematic illustrations of the microstructure of three hydrogels containing different concentrations of $CaCl_2$ below 0° C.; (B) 0 wt. % $CaCl_2$—hydrogel freezes at −20° C. and becomes a stiff piece of ice. The schematic shows ice crystals formed in the polymer network. (C) a 10 wt. % $CaCl_2$ hydrogel that creates a partially frozen slurry gel. The schematic shows ice and salt solution inside polymer network. (D) a 30 wt. % $CaCl_2$-hydrogel that does not freeze at −20° C. and remains transparent. The schematic of the hydrogel shows the $CaCl_2$ salt solution inside the polymer network.
Figure 5C:
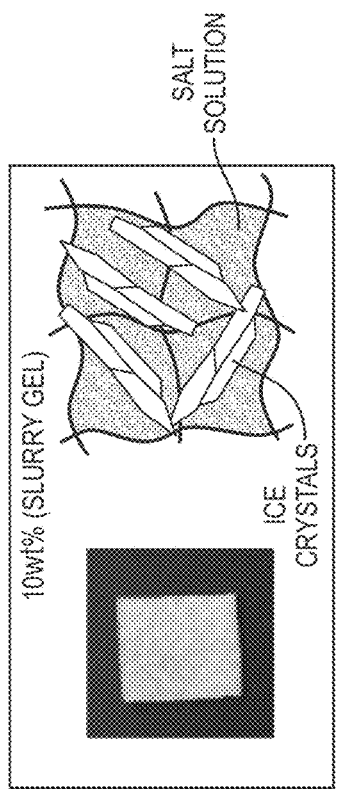
Figure 5D:
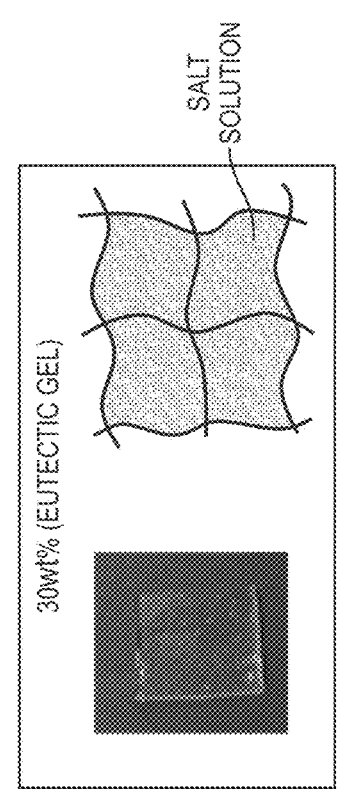
Figure 5A:
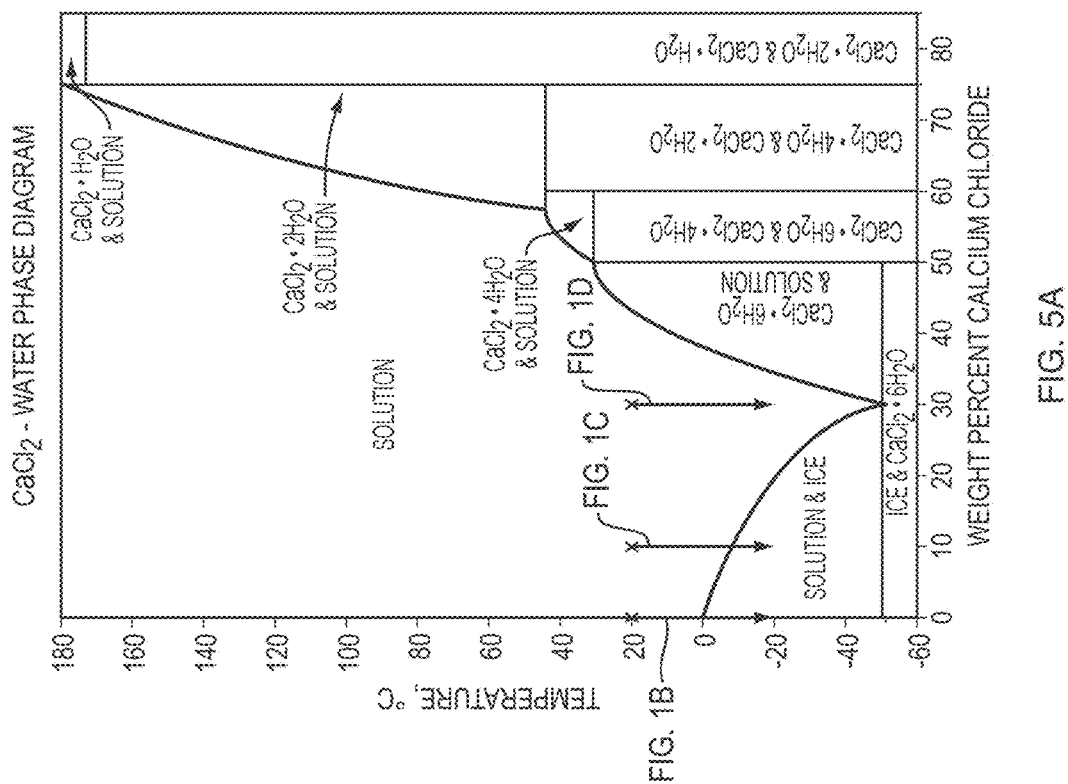
FIG. 5A is the phase diagram of the $CaCl_2$ water system. Red arrows correspond to three types of gels obtained with 0 wt. %, 10 wt. % and 30 wt. % $CaCl_2$ concentrations when cooled from room temperature.

This behavior may be understood with reference to the $CaCl_2$-water phase diagram (FIG. 5A). For example, assume the temperature of the hydrogel decreases from 20° C. to −20° C. In the phase diagram of FIG. 5A, this phase transition is represented as a straight line (b). For a salt concentration of 0 wt. % and a temperature above 0° C., it may be observed that the solution is in a liquid phase. As the temperature decreases below 0° C., the solution undergoes a phase transition from its liquid phase to its solid phase (ice). Similar behavior is observed in 0 wt. % $CaCl_2$-hydrogels. With further reference to the schematic 0 wt. % $CaCl_2$-hydrogels of FIG. 5B, this when the hydrogel temperature decreases below 0° C. ice crystals form in the polymer network. These ice crystals dominate over the polymer network and the hydrogel becomes a stiff piece of ice. Hydrogel materials exhibiting this solid ice structure may be interchangeably referred to as "ice gels" herein.

For a 10 wt. % $CaCl_2$ solution, when the temperature is decreased from 20° C. to −20° C., the solution phase changes to a slurry mixture of solution and ice crystals, as illustrated by line (c) in FIG. 5A). Similar behavior is observed for 10 wt. % $CaCl_2$-hydrogels when decreased from 20° C. to −20° C. Two phases present: ice crystals and salt solution inside the polymer network, as illustrated in FIG. 5C. Hydrogel materials exhibiting this two phase may be interchangeably referred to as "slurry gels" herein. When temperature decreases along line (c) of the $CaCl_2$-water phase diagram more ice crystals form. The hydrogel remains flexible but hardens gradually. According to the phase diagram, a 10 wt. % slurry gel stays in the flexible slurry phase until the temperature is −50° C., where it enters the ice and $CaCl_2.6H_2O$ phase field.

For a 30 wt. % $CaCl_2$ solution, as the temperature is decreased from 20° C. to −20° C., the solution does not change phase and stays in solution phase even until −50° C., line (d) in FIG. 5A. Similarly, a 30 wt. % $CaCl_2$-hydrogel remains in solution phase when cooled down as in FIG. 5D. (As this concentration corresponds to eutectic concentration, these gels are interchangeably referred to as "eutectic gels" herein.

EXAMPLES

The following examples are given to illustrate synthesis, mechanical, electrical, and thermal properties of specific embodiments of the disclosed hydrogels but are not to be considered as limiting in any way.

Example 1—Hydrogel Synthesis

Polyacrylamide-alginate hybrid hydrogels were prepared using the following procedure. Powders of alginate (LF 20/40; FMC Biopolymer) and acrylamide (Sigma-Aldrich product no. A8887) were dissolved in deionized water and mixed to form a homogeneous solution. Ammonium persulfate (AP; Sigma-Aldrich product no. A9164) in an amount 0.0017 times the weight of acrylamide, was added to the solution as a photo initiator for polyacrylamide. N,N-methylenebisacrylamide (MBAA; Sigma-Aldrich product no. M7279) in an amount 0.0006 times the weight of acrylamide, was added to the solution as the cross-linker for polyacrylamide. N,N,N',N'-tetramethylethylenediamine (TEMED; Sigma-Aldrich product no. T7024) in an amount 0.0025 times the weight of acrylamide, was added to the solution as a cross-linking accelerator for polyacrylamide. Calcium sulfate dihydrate ($CaSO_4.2H_2O$; Sigma-Aldrich product no. 31221) in an amount 0.1328 times the weight of alginate, was added to the solution as an ionic cross-linker for alginate.

The solution was poured into a glass mold, 75.0×55.0×6.0 mm³, and covered with a glass plate. The solution was subsequently cured at room temperature by exposure to ultraviolet light (OAI LS 30 UV flood exposure system, 1.92 W/cm² power density) for eight minutes to covalently cross-link the polymer chains and form polyacrylamide-alginate hydrogels. These hydrogel samples were kept at room temperature for one day to ensure complete reaction. Subsequently, the polyacrylamide-alginate hydrogels were immersed in 10 wt. % and 30 wt. % calcium chloride ($CaCl_2$, McMaster-Carr. product no. 3190K36) solutions for five days to obtain 10 wt. % $CaCl_2$- and 30 wt. % $CaCl_2$-polyacrylamide-alginate hydrogels.

Example 2—Compression Testing

The mechanical behavior of polyacrylamide-alginate hydrogels containing 0 wt. %, 10 wt. %, and 30 wt. % $CaCl_2$ was examined under uniaxial compression as a function of temperature above and below the freezing temperature of water, 20° C., 10° C., 0° C., and −8° C. The hydrogel samples were prepared in cylindrical shapes having average dimensions 8 mm diameter and 2 mm height and compression tests were performed using a universal testing system equipped with force and displacement sensors. Each sample was positioned between parallel plates attached to the testing system and subjected to a compressive force by moving the parallel plates towards one another at a displacement rate of 50 μm/min.

Prior to testing, each sample was equilibrated at the temperature of interest for 15 minutes. For tests performed on samples at temperatures below 0° C., an aluminum container containing an ice and salt mixture was attached to the upper plate of the testing system to maintain the sample temperature during the test.

The compressive force-displacement curves were measured for each of the samples at temperatures of 20° C., 10° C., 0° C., and −8° C. and are illustrated in FIGS. 6A-6D, respectively. Corresponding measurements of contact stiffness as a function of temperature are illustrated in FIG. 7. The nominal stress was obtained by dividing the force by the initial cross-sectional area of the sample. Strain was calculated by dividing the deformation of the sample by its initial height. Samples were loaded to a displacement of approximately 0.475 strain or failure, whichever occurred first.

(a) Compression Behavior at and Above 0° C.

Figure 6A:
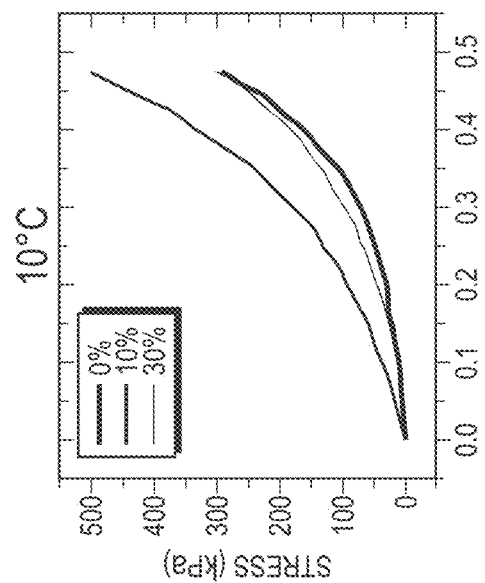
FIGS. 6A-6D present plots of the stress-strain response for polyacrylamide-alginate hydrogels containing different concentrations of $CaCl_2$; (A) 20° C.; (B) 10° C.; (C) 0° C.; (D) −8° C.
Figure 6B:
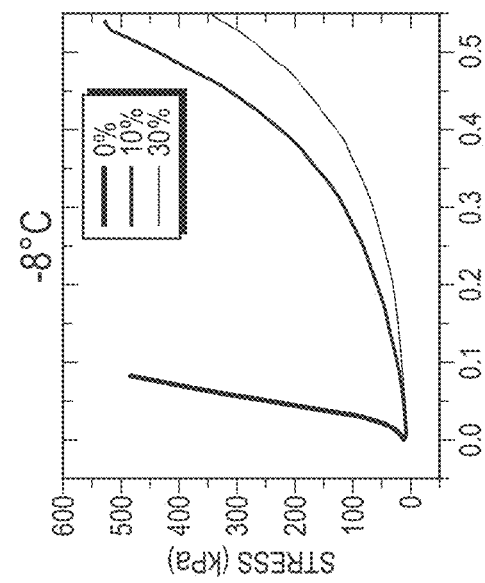
Figure 6C:
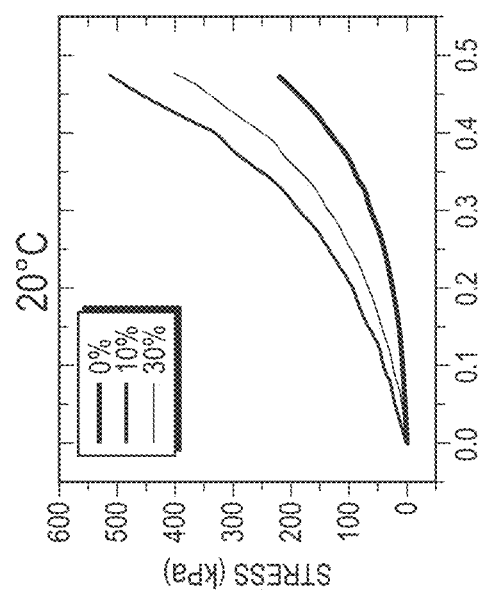

With reference to the stress-strain curves of FIGS. 6A-6C, a non-linear response is observed for each of the hydrogel samples tested at 20° C., 10° C., and 0° C. Each of the samples survived to maximum strain and exhibited recoverable (elastic) deformation. The concave shape of the stress-strain response indicates that, as the applied load increases the unit load required to produce a given strain increases.

Figure 7B:
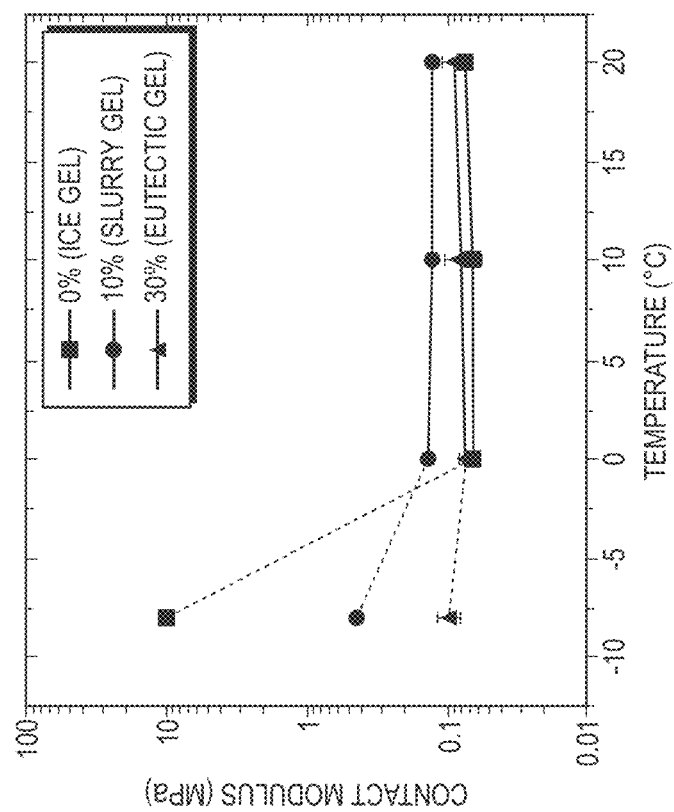
FIG. 7B presents a plot of measured contact modulus as a function of temperature for polyacrylamide-alginate hydrogels containing $CaCl_2$ concentrations of 0 wt. %, 10 wt. % and 30 wt. %.
Figure 7A:
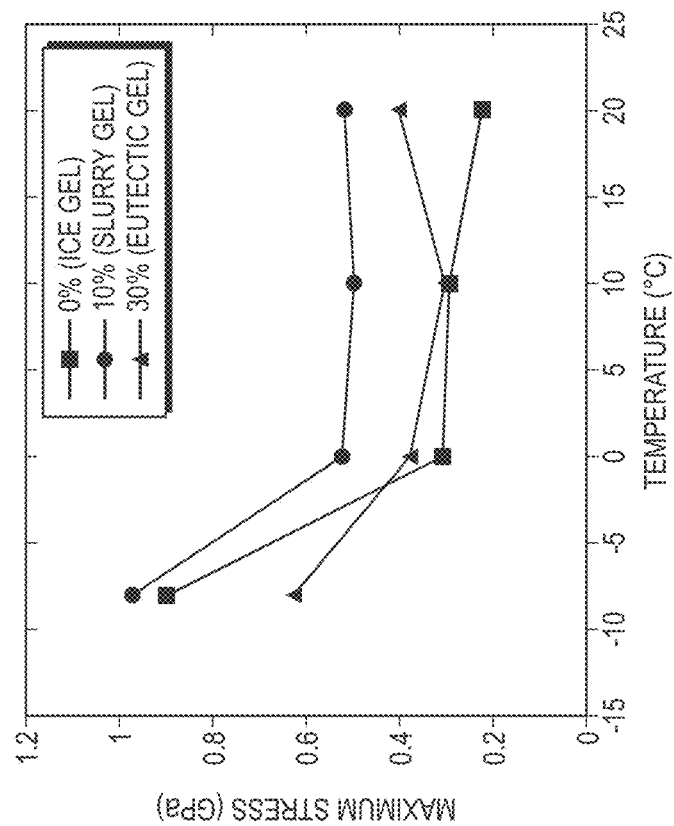
FIG. 7A presents a plot of measured compression stress at maximum displacement or failure as a function of temperature for polyacrylamide-alginate hydrogels containing $CaCl_2$ concentrations of 0 wt. %, 10 wt. % and 30 wt. %.

In another aspect, it is observed that for a given salt concentration, as the sample temperature approaches zero (i.e., samples measured at 20° C., 10° C., and 0° C.), the contact modulus is approximately constant (FIG. 7B). Furthermore, for a given temperature, the addition of $CaCl_2$ increases the maximum stress at maximum deformation and the contact modulus of the hydrogel samples over that of samples for which $CaCl_2$ is not added (FIG. 7A). For example, the 0 wt. % $CaCl_2$-hydrogels exhibit the lowest stress at maximum deformation and contact modulus, approximately 225 MPa to 310 MPa and approximately 0.06 MPa to 0.7 MPa, respectively. The 30 wt. % $CaCl_2$-hydrogels exhibited the next highest contact modulus, approximately 305 MPa to 405 MPa and 0.08 MPa to 0.09 MPa, respectively. The 10 wt. % $CaCl_2$-hydrogels exhibited the highest contact modulus, approximately 500 MPa to 525 MPa and 0.2 MPa to 0.3 MPa, respectively.

Without being bound by theory, it is believed that these trends in contact modulus may be understood by consideration of two mechanisms occurring simultaneously with increased $CaCl_2$ concentration: increased alginate cross-linking and increased hydrogel swelling. As discussed above with respect to FIGS. 2A-2c, with increasing $CaCl_2$ concentration, the alginate cross-link density within the hydrogel increases until all cross-linking sites are occupied, tending to increase the contact modulus of the hydrogel. Concurrently, increasing the $CaCl_2$ concentration also increases swelling of the hydrogel, accommodating more water and tending to lower the contact modulus of the hydrogel. Based upon the observations that contact modulus of the hydrogel increases as the $CaCl_2$ concentration rises from 0 wt. % to 10 wt. %, it appears that increased alginate cross-linking dominates over swelling within this regime. Furthermore, given that the contact modulus of the hydrogel decreases as the $CaCl_2$ concentration rises from 10 wt. % to 30 wt. %, it appears that, at some point within this range, all alginate cross-linking sites become occupied and swelling starts to dominate.

(b) Compression Behavior Below 0° C.

Even though the difference between these hydrogels is the $Ca^{2+}$ concentration, the behavior of the hydrogels can vary significantly when the sample temperature is below 0° C.

Figure 6D:
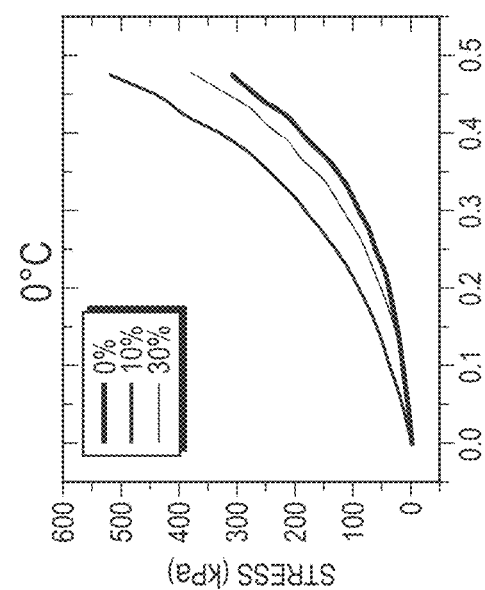

With reference to the stress-strain responses illustrated in FIG. 6D, it is observed that the 10 wt. % $CaCl_2$- and 30 wt. % $CaCl_2$-hydrogel materials exhibit non-linear deformation similar to that discussed previously and each of these samples recovered this deformation after unloading. Maximum stress and contact modulus are observed to modestly increase or remain approximately constant in the 10 wt. % $CaCl_2$- and the 30 wt. % $CaCl_2$-hydrogel materials from 0° C. to −8° C. (FIG. 7A). For example, the measured maximum stress of the 30 wt. % $CaCl_2$-hydrogel material increases roughly 65%, from approximately 380 MPa to approximately 630 MPa. Concurrently, the contact modulus remains unchanged as the sample remains ice free (FIG. 7B). The measured maximum stress of the 10 wt. % $CaCl_2$-hydrogel material increases roughly 85%, from approximately 525 MPa to approximately 975 MPa. The contact modulus of this sample further exhibits a slight increase below 0° C., due to ice crystal formation. However, as illustrated by the stress-strain response, the elastic character of this material is retained despite the presence of the ice crystals.

In contrast, the 0 wt. % $CaCl_2$-hydrogel sample exhibited a brittle-elastic response and significantly reduced strain at failure, approximately 0.08. Furthermore, the failure stress and contact modulus of the 0 wt. % $CaCl_2$-hydrogel material each drastically increase from 0° C. to −8° C. For example, the failure stress was roughly three times the maximum stress at 0° C., 900 MPa versus 310 MPa. Furthermore, the contact modulus increased over 100-fold, from approximately 0.07-0.08 MPa to approximately 10 MPa. These changes are believed to be attributable to the structure of the hydrogel turning similar to ice.

However, while the measured contact modulus of the 0 wt. % $CaCl_2$-hydrogel material at −8° C. was measured to be approximately 10 MPa, significantly lower than the value of 10 GPa that reported for ice at −10° C. (Shazly, et al., "High strain-rate behavior of ice under uniaxial compression," *Intl. Solids and Structures*, 46, 1499-1515 (2009)). As the 0 wt. % CaCl$_2$-hydrogel material was expected to behave similar to ice, this observation is contrary to what was expected.

Figure 8B:
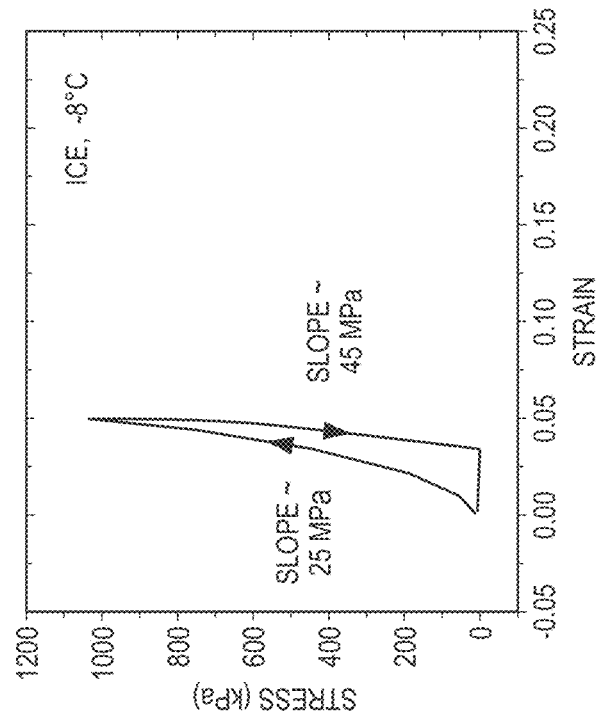
FIGS. 8A-8B are plots of stress as a function of strain during loading and unloading under compression at −8° C.; (A) polyacrylamide-alginate hydrogel containing a $CaCl_2$ concentration of 0 wt. % ("ice gel"); (B) ice.
Figure 8A:
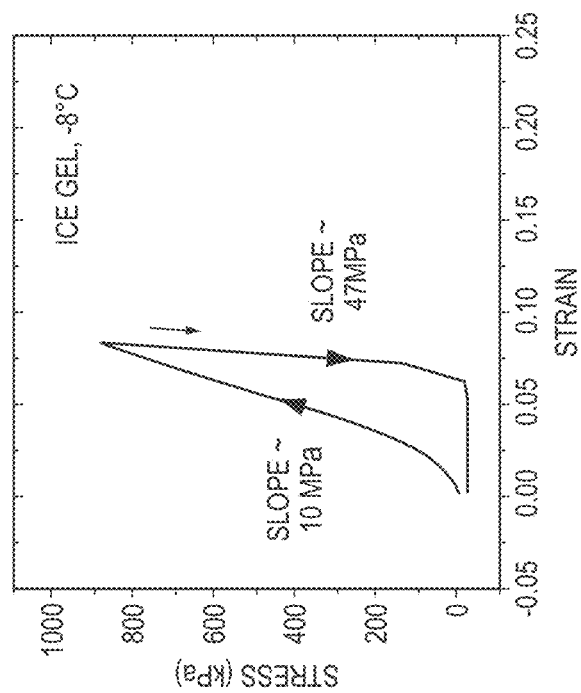

To further investigate this discrepancy whether this effect could be attributed to misalignment of the plates and the sample, the loading-unloading curves of the 0 wt. % CaCl$_2$-hydrogel material and an ice sample, each at −8° C. were measured to confirm. The results of these tests are illustrated in FIGS. 8A-8B. It is observed that the loading and unloading slopes for each sample, is comparable. Furthermore, the measured mechanical behavior of both ice and similar. As the results of the pure ice samples failed to reproduce the modulus expected from the literature, it was concluded that this effect is not due to any misalignment.

(c) Stress Relaxation Testing

Having eliminated misalignment as the source of the contact modulus discrepancy between the 0 wt. % CaCl$_2$-hydrogel material and the ice sample below freezing, the possible influence of an increase in temperature during the mechanical testing was further investigated. Even though temperature of the upper and lower plates is controlled during testing, the test is performed in open air. Thus, it is possible that the sample temperature is closer to the ice melting temperature, and has been widely studied for ice near the melting temperature. Creep is the phenomenon of deformation at a constant load and is behavior can occur temperature can be very close to melting temperature (J. W. Glen, "The creep of polycrystalline ice," *Proc. R. Soc. Lond. A*, 228, 519-538, (1955)).

Figure 9A:
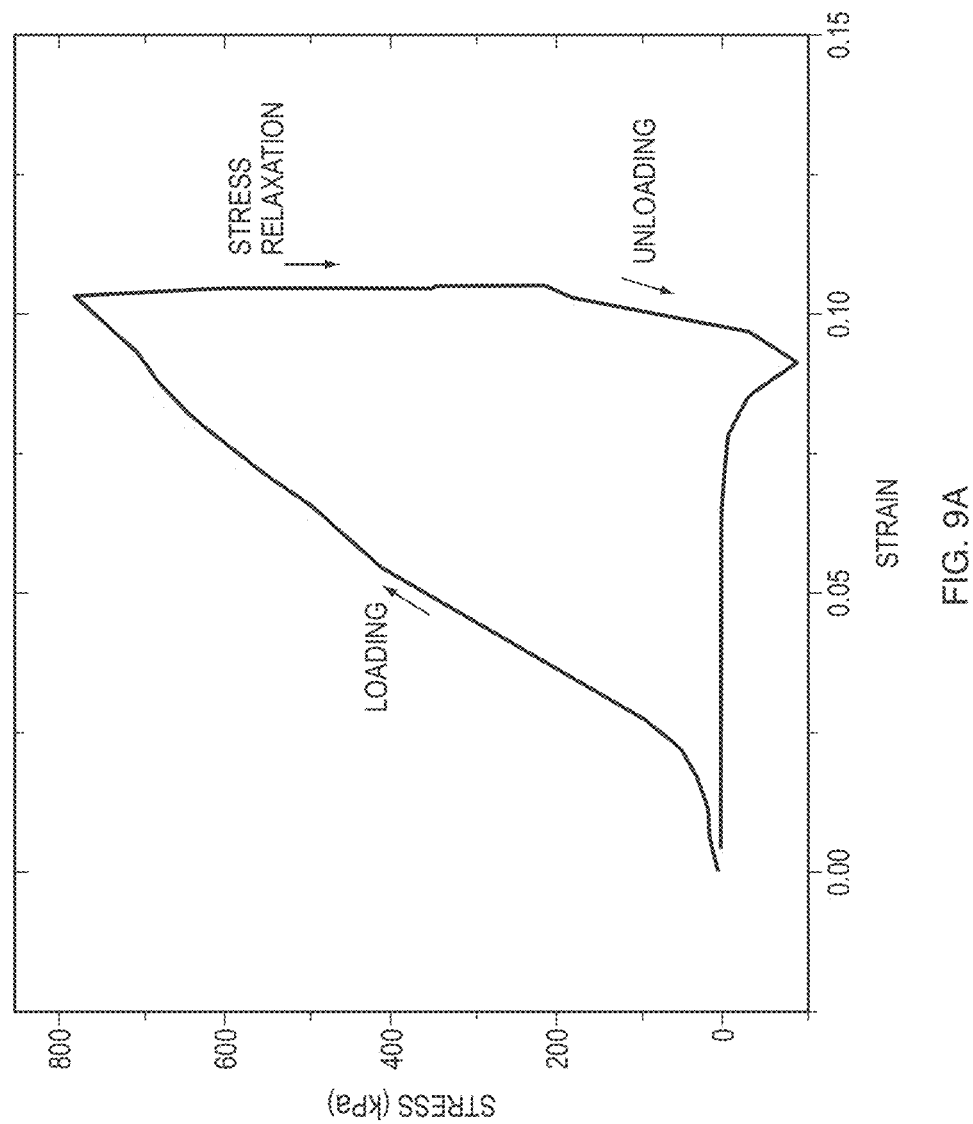
FIGS. 9A-9B are plots of stress as a function of time during loading and unloading under compression at −8° C.; (A) polyacrylamide-alginate hydrogel containing a $CaCl_2$ concentration of 0 wt. % ("ice gel"); (B) ice.
Figure 9B:
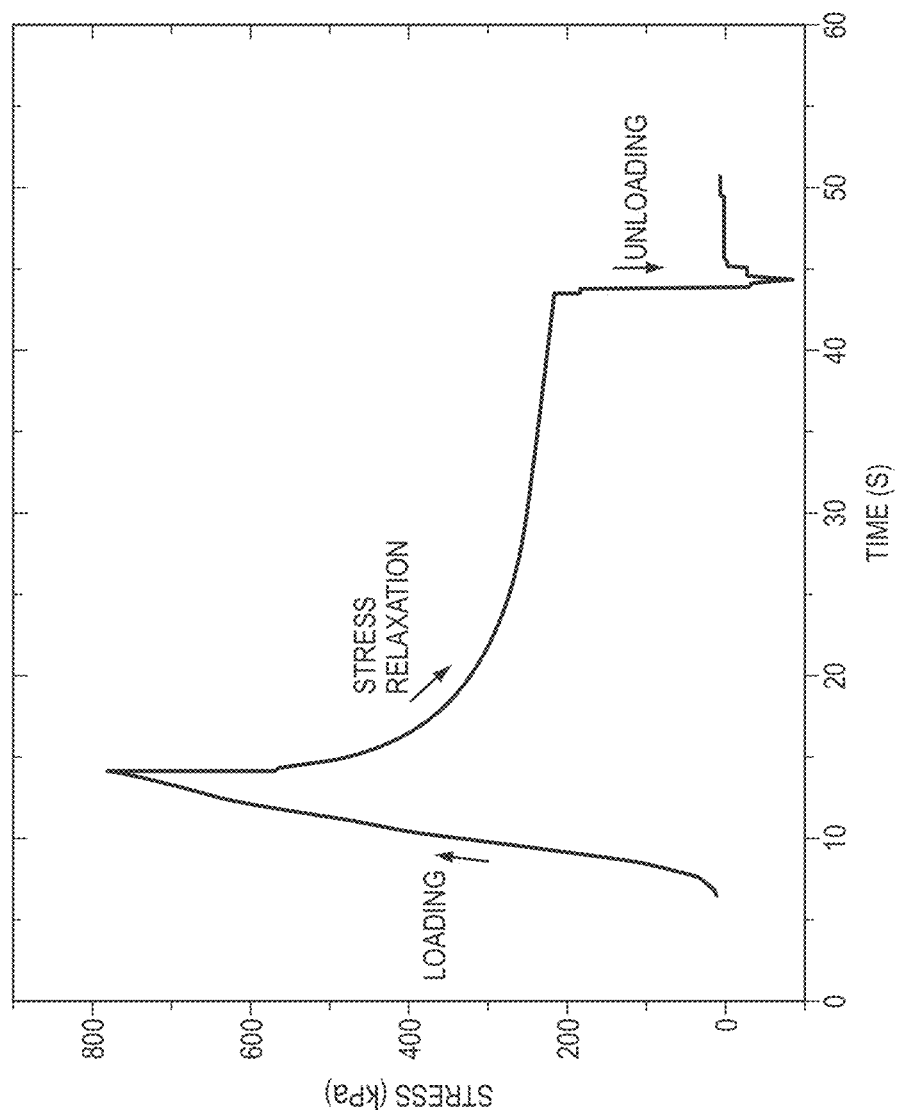

To investigate whether creep was occurring, a stress relaxation test was performed, the where deformation is measured under constant load. The measured stress-strain and stress-time response is illustrated in FIGS. 9A-9b, respectively. Significant stress relaxation was quickly observed when the load is held constant. These tests suggest that the difference of moduli in the measurements and literature data is due to the creep of ice. Thus, even though precise modulus measurement of the 0 wt. % CaCl$_2$-hydrogel material were not obtained, it has been shown that 0 wt. % CaCl$_2$-hydrogel material behaves similar to ice at low temperatures.

Example 3—Thermal Testing

Figure 10A:
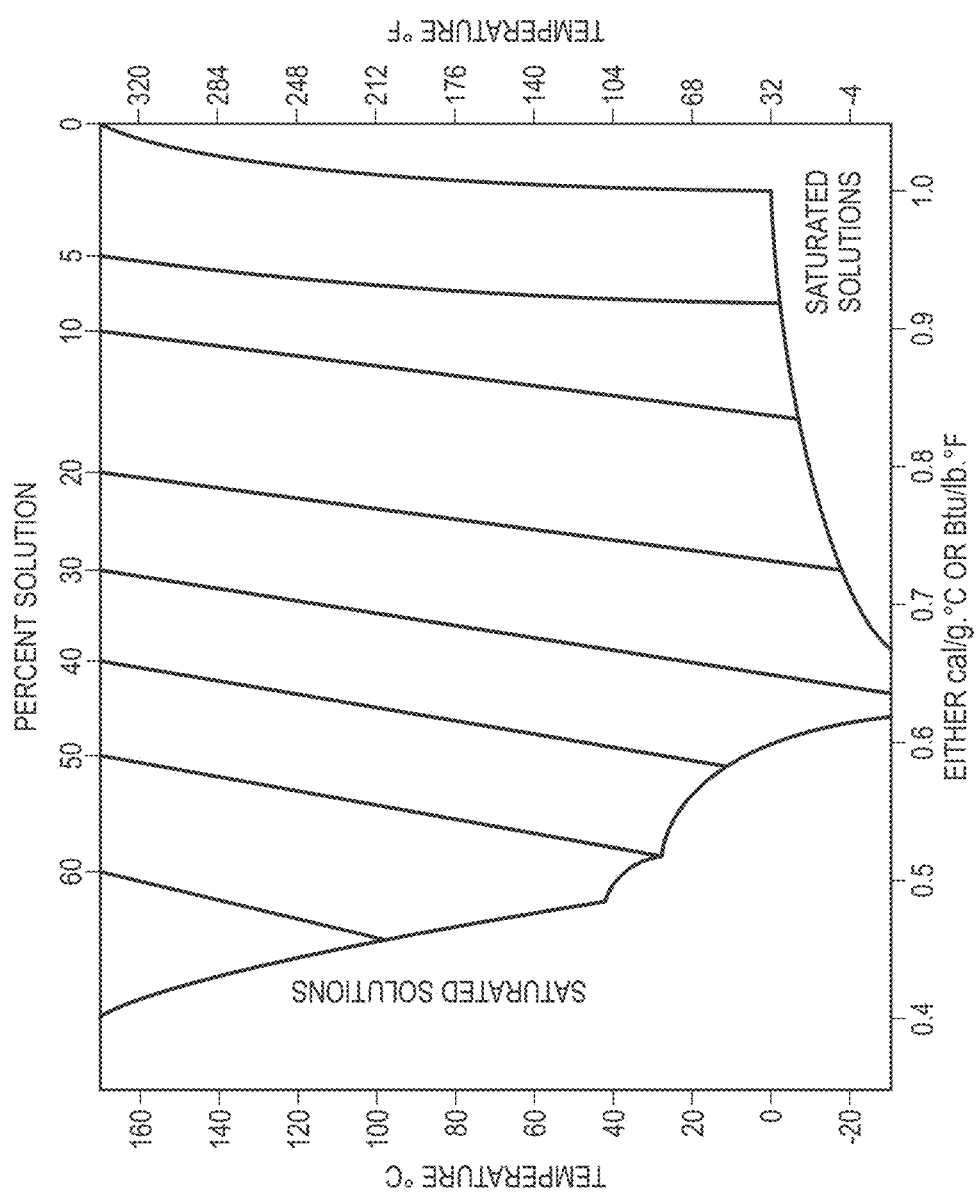
FIG. 10A is a plot of the specific heat of the $CaCl_2$-water system.

For cooling applications with slurry gels, it can be important to know the reduction in heat absorption by adding CaCl$_2$ in to the gels. To calculate the reduction in heat absorption, the thermodynamic properties of CaCl$_2$-water system is used. Specifically, the phase diagram (FIG. 5A) and specific heat diagram (FIG. 10A). Heat absorbed by 100 g of water with different concentrations of CaCl$_2$ is calculated for two situations, cooling from 0° C. to −20° C. and from 0° C. to −50° C., as illustrated below in Equations (1)-(4):

$$\Delta H_{Total} = \Delta H_{Heat\ of\ fusion\ of\ ice} + \Delta H_{ice} + \Delta H_{salt\ solution} \quad (1)$$

where ΔH is change in heat and ΔT is change in temperature.

$$\Delta H_{Heat\ of\ fusion\ of\ ice} = \text{Heat of fusion of ice}\left(\frac{\text{cal}}{\text{g}}\right) \times \text{Mass of ice (g)} \quad (2)$$

$$\Delta H_{ice} = \text{Mass of ice (g)} \times \text{Heat capacitance of ice}\left(\frac{\text{cal}}{\text{g}^\circ\ \text{C.}}\right) \times \Delta T(^\circ\ \text{C.}) \quad (3)$$

$$\Delta H_{salt\ solution} = \text{Mass of salt solution(g)} \times Avg.\ \text{heat capacitance of salt solution}\left(\frac{\text{cal}}{\text{g}^\circ\ \text{C.}}\right) \times \Delta T(^\circ\ \text{C.}) \quad (4)$$

For example, consider a 5 wt. % CaCl$_2$ solution that contains 100 g of water and 5.26 g of CaCl$_2$ with a total solution mass of 105.26 g. According to the CaCl$_2$-water phase diagram (FIG. 5A), a 5 wt. % solution at −20° C. has 20 wt. % CaCl$_2$ in solution phase. This can be seen by drawing a tie line at −20° C. in the phase diagram. Thus, at −20° C., the hydrogel contains a 26.32 g of CaCl$_2$ solution and the mass of ice in the mixture as 78.94 g.

From Equation (2):

$$\Delta H_{Heat\ of\ fusion\ of\ ice} = 79.7\left(\frac{\text{cal}}{\text{g}}\right) \times 78.94(\text{g}) = 6.295\ \text{kcal}$$

From equation (3):

$$\Delta H_{ice} = 78.94(\text{g}) \times 0.5\left(\frac{\text{cal}}{\text{g}^\circ\ \text{C.}}\right) \times 20^\circ\ \text{C.} = 0.789\ \text{kcal}$$

From equation (4), $$\Delta H_{salt\ solution} = 26.32(\text{g}) \times 0.7\left(\frac{\text{cal}}{\text{g}^\circ\ \text{C.}}\right) \times 20^\circ\ \text{C.} = 0.369\ \text{kcal}$$

Thus from equation (1), $\Delta H_{Total} = 7.453$ kcal.

Figure 10B:
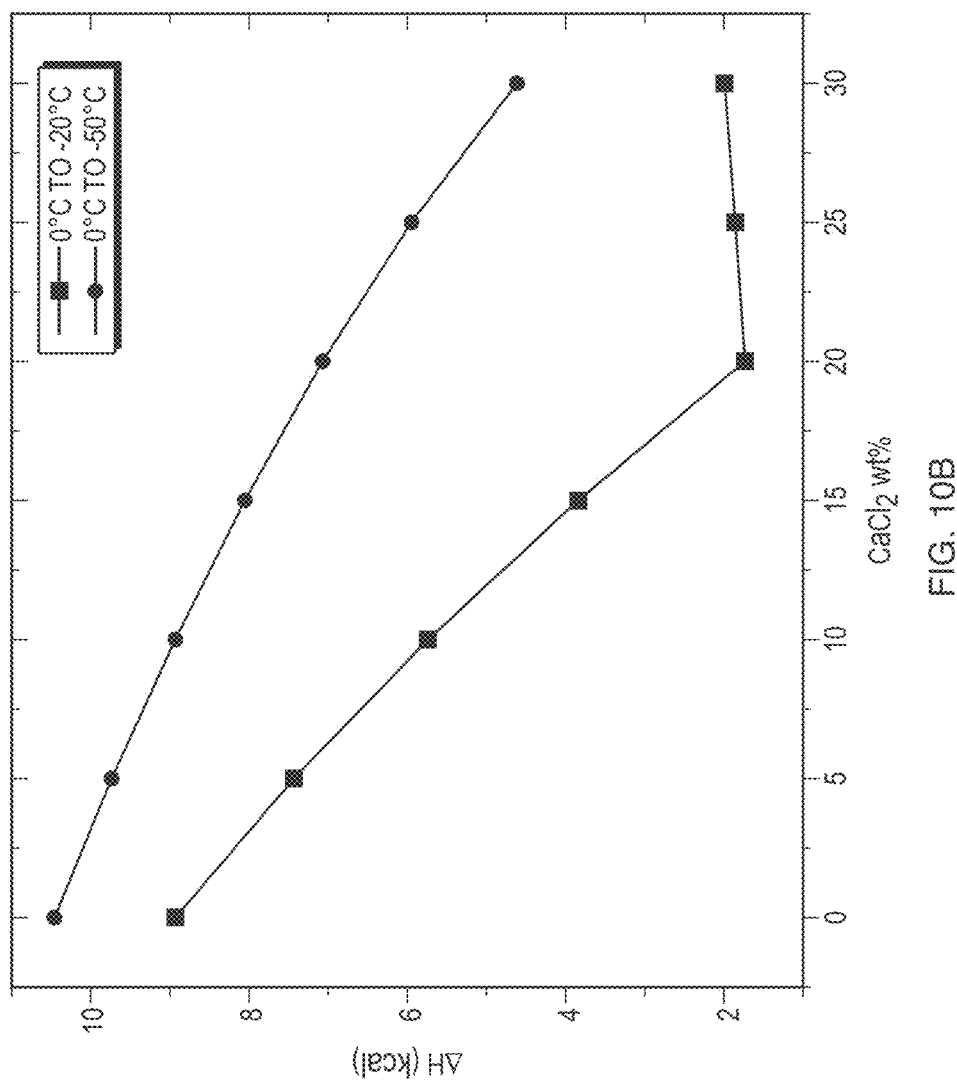
FIG. 10B is a plot of heat absorbed (ΔH) by 100 g of water as a function of $CaCl_2$ concentration when cooled from 0° C. to −20° C. and from 0° C. to −50° C.

FIG. 10B plots heat absorbed by 100 g of water as function of CaCl$_2$ concentration when cooled from 0° C. to −20° C. and from 0° C. to −50° C. It is observed that maximum heat absorption is obtained for 0 wt. % CaCl$_2$ samples but they limit the performance at low temperature because they freeze solid. When 30 wt. % CaCl$_2$ is added, the samples do not freeze but the heat absorption is much lower and cannot be useful in cooling applications. Accordingly, samples with CaCl$_2$ concentrations between 0 wt. % and 30 wt. % are useful in cooling applications. Thus, the results of FIG. 10B provide useful information in developing gel packs for cooling applications.

Figure 11A:
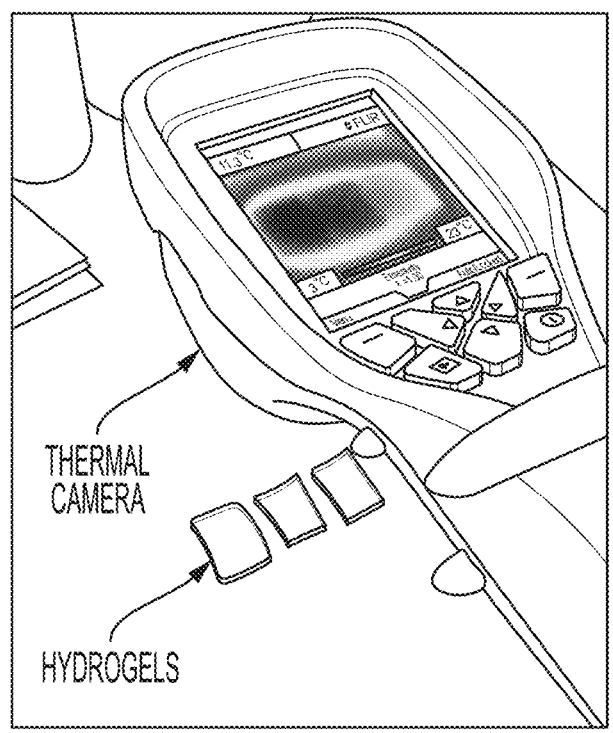
FIG. 11A is a photograph illustrating a thermal camera for measuring temperature of polyacrylamide-alginate hydrogels.

To show that CaCl$_2$-hydrogels behave in a similar manner to CaCl$_2$-water system infrared thermal images of hydrogels having 0 wt. %, 10 wt. %, and 30 wt. % CaCl$_2$ were also obtained. A thermal camera was employed to acquire thermal images (FIG. 11A). Samples were stored in a −11° C. freezer and time-lapse thermal images were taken at 10 sec, 2 min, 5 min, and 10 min after removal from the freezer and are illustrated in FIGS. 11B-11e. As illustrated in FIGS. 11B-11E, it is observed that after 10 sec, each of the samples remains at approximately the same temperature. However, at 2 min and beyond, the 30 wt. % CaCl$_2$ hydrogel sample was significantly warmer than the other two samples. Of the 0 wt. % and 10 wt. % CaCl$_2$ hydrogel samples, the 10 wt. % CaCl$_2$ hydrogel kept colder than 0 wt. % sample until 0° C. Once above 0° C., the 10 wt. % CaCl$_2$ hydrogel heated faster than the 0 wt. % CaCl$_2$ hydrogel. Accordingly, these results demonstrate that the 10 wt. % CaCl$_2$ hydrogel performed best at temperatures less than 0° C.

Example 4—Capacitance Measurement

Figure 12D:
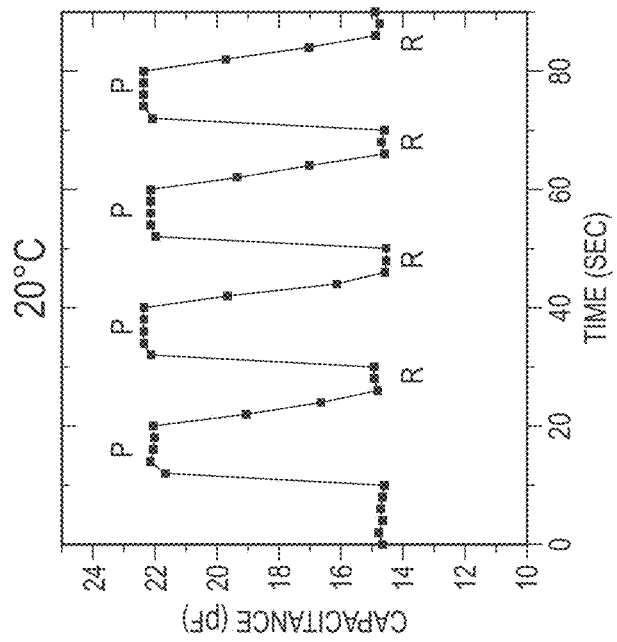
FIGS. 12B-12D illustrate capacitance measured at 20° C. with a finger press employing the sensor of FIG. 12A. 'P' denotes finger press and 'R' denotes release.

Non-freezing hydrogels are useful in flexible ionic conductors below water freezing temperature. A sensor including 30 wt. % CaCl$_2$-hydrogel layers was fabricated to demonstrate detection of finger touch pressure at temperatures above and below the freezing temperature of water. The sensor is schematically illustrated in FIG. 12A and included a 2 cm×2 cm×0.5 mm dielectric elastomer (VHB 4905, 3M) covered with two 30 wt. % $CaCl_2$-hydrogel layers of 2 cm×2 cm×0.2 mm dimensions. The top and bottom hydrogels were connected to electrodes. The electrodes were further connected to a capacitance meter (LCR/ESR meter, Model 885, BK Precision) set to a sinusoidal measurement signal of 1V and 100 Hz. The design is similar to that described in Sun, et al., "Ionic skin," *Adv. Mater.*, 26, 7608-7614 (2014), except that it is not necessary to put an additional elastomer layer on the top and bottom for protection because the hydrogel is both strong and tough.

Figure 12B:
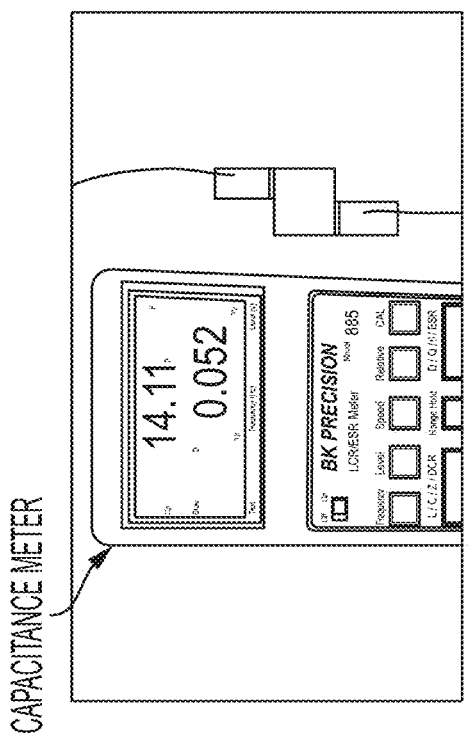
Figure 12C:
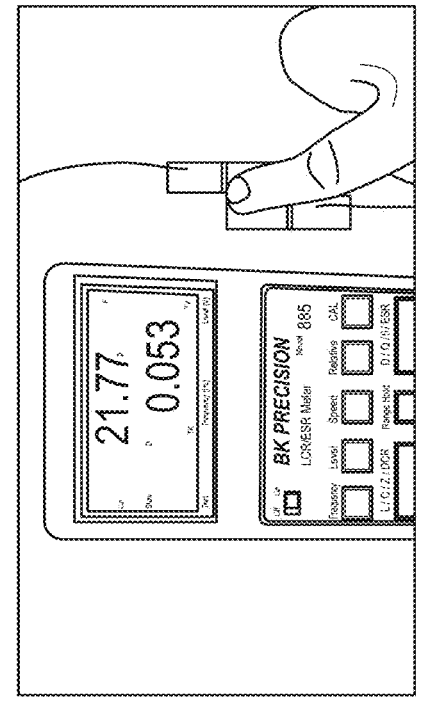
Figure 12E:
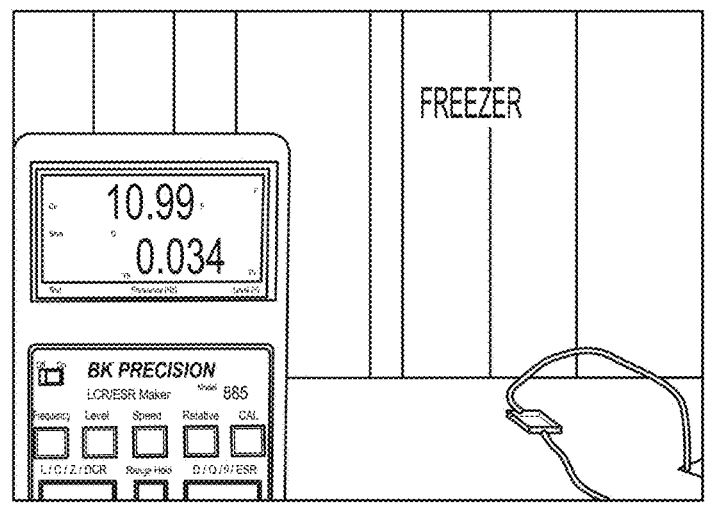
FIGS. 12E-12G illustrate capacitance measured at −11° C. with a finger press employing the sensor of FIG. 12A. 'P' denotes finger press and 'R' denotes release.
Figure 12F:
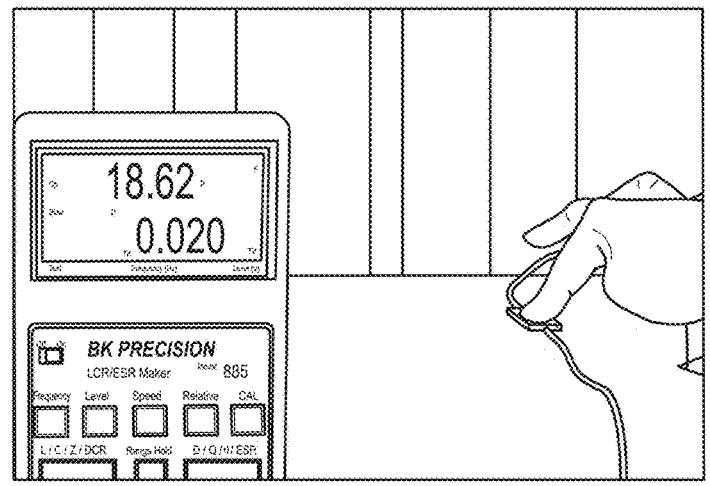
Figure 12G:
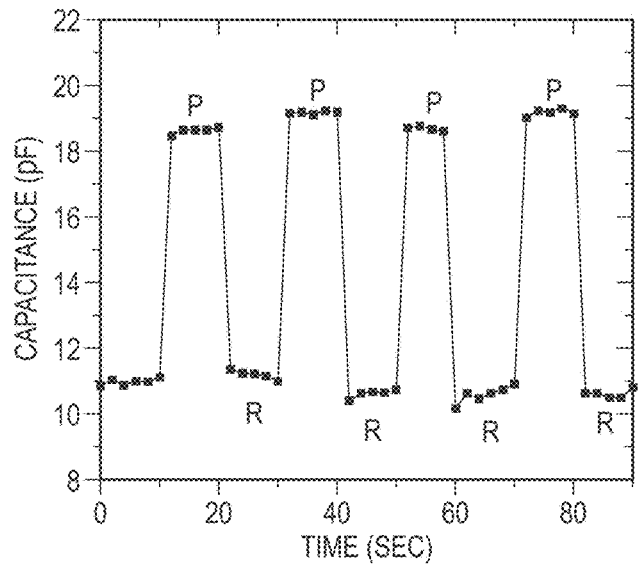

The sensor was attached to a glass plate (FIGS. 12B, 12E) and capacitance was measured with finger touch at 20° C. (FIGS. 12C, 12D) and inside a freezer at −11° C. (FIGS. 12F, 12G). In the capacitance measurements of FIGS. 12D and 12G, 'P' denotes finger press and 'R' denotes release. It is observed that at both temperatures, the sensor accurately measures high capacitance when the sensor is pressed, approximately 18-19 pF, and low capacitance when the sensor is released, approximately 10-11 pF. This successful test shows the potential of eutectic hydrogel based ionic devices that can work as sensors in very low temperature environments (FIG. 13).

In conclusion, embodiments of a new class of freeze-resistant polyacrylamide-alginate hydrogels are presented. The current subject matter demonstrates hydrogels that are partially frozen and hydrogels that do not freeze below water freezing temperature. By adding suitable amounts of salt, the phase of hydrogels can be determined at a given temperature using the phase diagram of salt-water system. These hydrogels are strong and flexible at low temperatures, as compared to conventional hydrogels that freeze solid. These new classes of hydrogels can be used in range of applications including cooling gel packs, ionic devices, and soft robotics at low temperatures.

For example, the experimental investigations discussed above suggest that slurry gels and eutectic gels are useful in applications that require strong and flexible hydrogels below water freezing temperatures. Slurry gels can overcome some of the problems associated with current gel packs. Current gel packs contain viscous liquid like gel and in order to avoid flowing, many gel packs contain number of compartments. In contrast, partially frozen, strong hydrogels do not need any compartments and the flexibility allows easy wrap around. Not only can they be used to relieve muscle pain, they can also be used in keeping food or drinks cold for a long time and be useful in transporting medicine or food that need to be kept cold. Thus, with strong gel packs any leaking problem can be avoided.

Eutectic gels can be used as pressure sensors at low temperatures to sense pressure of a finger touch such as touch screen keypad or a pressure sensor that a person can step on it. Eutectic gels might also be useful in soft robotic applications at low temperatures.

STATEMENTS REGARDING INCORPORATION BY REFERENCE AND VARIATIONS

All references cited throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in this application. For example, a reference that is partially inconsistent is incorporated by reference except for the partially inconsistent portion of the reference.

One of ordinary skill in the art will appreciate that starting materials, biological materials, reagents, synthetic methods, purification methods, analytical methods, assay methods, and biological methods other than those specifically exemplified can be employed in the practice of embodiments of the disclosure without resort to undue experimentation. All art-known functional equivalents, of any such materials and methods are intended to be included in the disclosed embodiments.

As used herein, the term "group" may refer to a functional group of a chemical compound. Groups of the present compounds refer to an atom or a collection of atoms that are a part of the compound. Groups of the present compounds may be attached to other atoms of the compound via one or more covalent bonds. Groups may also be characterized with respect to their valence state. The present compounds include groups characterized as monovalent, divalent, trivalent, etc. valence states As used herein, the term "substituted" refers to a compound where a hydrogen is replaced by another functional group.

When a group of substituents is disclosed herein, it is understood that all individual members of that group and all subgroups, including any isomers, enantiomers, and diastereomers of the group members, are disclosed separately.

When a Markush group, or other grouping is used herein, all individual members of the group and all combinations and sub-combinations possible of the group are intended to be individually included in the disclosure.

When a compound is described herein such that a particular isomer, enantiomer, or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

As to any of the groups described herein that contain one or more substituents, it is understood that such groups do not contain any substitution or substitution patterns which are sterically impractical and/or synthetically non-feasible. In addition, the compounds of this disclosure include all stereochemical isomers arising from the substitution of these compounds. Optional substitution of alkyl groups includes substitution with one or more alkenyl groups, aryl groups or both, where the alkenyl groups or aryl groups are optionally substituted. Optional substitution of alkenyl groups includes substitution with one or more alkyl groups, aryl groups, or both, where the alkyl groups or aryl groups are optionally substituted. Optional substitution of aryl groups includes substitution of the aryl ring with one or more alkyl groups, alkenyl groups, or both, where the alkyl groups or alkenyl groups are optionally substituted.

As used herein, and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. Additionally, the terms "a" (or "an"), "one or more" and "at least one" can be used interchangeably herein.

As used herein, the term "comprising" is synonymous with "including," "having," "containing," and "characterized by" and each can be used interchangeably. Each of these terms is further inclusive or open-ended and does not exclude additional, unrecited elements or method steps.

As used herein, the term "consisting of" excludes any element, step, or ingredient not specified in the claim element.

As used herein, the term "consisting essentially of" does not exclude materials or steps that do not materially affect the basic and novel characteristics of the claim. In each instance herein any of the terms "comprising", "consisting essentially of," and "consisting of" may be replaced with either of the other two terms.

The embodiments illustratively described herein suitably may be practiced in the absence of any element or elements, limitation or limitations which is not specifically disclosed herein.

The expression "of any of claims XX-YY" (where XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which the disclosed embodiments belong.

Whenever a range is given in the specification, for example, a temperature range, a time range, a composition range, or a concentration range, all intermediate ranges and sub-ranges, as well, as all individual values included in the ranges given, are intended to be included in the disclosure. As used herein, ranges specifically include the values provided as endpoint values of the range. For example, a range of 1 to 100 specifically includes the end point values of 1 and 100. It will be understood that any subranges or individual values in a range or sub-range that are included in the description herein can be excluded from the claims herein.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the claimed embodiments. Thus, it should be understood that although the present application may include discussion of preferred embodiments, exemplary embodiments and optional features, modification and variation of the concepts herein disclosed may be resorted to by those skilled in the art. Such modifications and variations are considered to be within the scope of the disclosed embodiments, as defined by the appended claims. The specific embodiments provided herein are examples of useful embodiments of the present disclosure and it will be apparent to one skilled in the art that they may be carried out using a large number of variations of the devices, device components, and methods steps set forth in the present description. As will be obvious to one of skill in the art, methods and devices useful for the present methods can include a large number of optional compositions and processing elements and steps.

What is claimed is:

1. A gel package comprising:
a freeze-resistant hydrogel composition comprising:
    a gel comprising an acrylamide-alginate copolymer;
    at least 50% water; and
    a hygroscopic compound; and
a seal for encapsulating the hydrogel composition.

2. The gel package of claim 1, wherein the compound comprises a divalent or trivalent salt.

3. The gel package of claim 2, wherein the salt is present at a concentration of 0.1 to 5 molar.

4. The gel package of claim 2, wherein the divalent salt is selected from the group consisting of calcium chloride, magnesium chloride, copper(II) chloride, zinc chloride, calcium oxide, magnesium oxide, barium oxide, magnesium sulfate, sodium sulfate, calcium sulfate, copper(II) sulfate, potassium carbonate, and sodium carbonate.

5. The gel package of claim 2, wherein the trivalent salt is selected from the group consisting of aluminum trichloride, gallium trichloride, iron(III) chloride, indium trichloride, cerium chloride, cerium trifluoromethanesulfonate, lanthanide chloride, lanthanide trifluoromethanesulfonate, ytterbium chloride, and ytterbium trifluoromethanesulfonate.

6. The gel package of claim 2, wherein the salt has a concentration selected within the range from 0.1 weight percent to 50 weight percent.

7. The gel package of claim 2, wherein the salt has a concentration of about 10 weight percent, 20 weight percent, 30 weight percent, or 40 weight percent.

8. The gel package of claim 2, wherein the salt comprises a mixture of a divalent salt and a trivalent salt; wherein the divalent salt comprises calcium chloride, magnesium chloride, zinc chloride, or copper chloride; and wherein the trivalent salt comprises aluminum trichloride, gallium trichloride, ferrous trichloride, or indium trichloride.

9. The gel package of claim 2, wherein the hydrogel includes a crosslinked network of hydrophilic polymer chains dispersed in water in which the salt has been dissolved.

10. The gel package of claim 9, wherein the polymer chains comprise polyacrylamide and/or alginate; and the crosslinks comprise N,N-methylenebisacrylamide and/or calcium sulfate.

11. The gel package of claim 9, wherein the hydrogel composition remains elastic at a minimum temperature less than the freezing temperature of water and greater than or equal to the eutectic temperature of the salt-water phase diagram.

12. The gel package of claim 1, wherein the hydrogel has a freezing point below 0° Celsius.

13. A gel package comprising:
a freeze-resistant hydrogel composition comprising:
a hydrogel comprising an acrylamide polymer in the absence of an alginate;
at least 50% water; and
a hygroscopic monovalent, divalent, or trivalent salt; and
a seal for encapsulating the hydrogel composition.

14. The gel package of claim 13, wherein the monovalent salt is selected from the group consisting of sodium chloride, lithium chloride, and potassium chloride.

15. An ionic sensor comprising:
two layers comprising a freeze-resistant hydrogel composition comprising:
a gel comprising an acrylamide-alginate copolymer;
at least 50% water; and
a hygroscopic compound;
a layer of a dielectric elastomer between the two hydrogel layers; and
two electrodes, wherein each layer of the hydrogel composition is coupled to a respective one of the two electrodes.

16. The ionic sensor of claim 15, wherein the hygroscopic compound comprises a divalent or trivalent salt.

17. The ionic sensor of claim 16, wherein the salt is present at a concentration of 0.1 to 5 molar.

18. The ionic sensor of claim 16, wherein the divalent salt is selected from the group consisting of calcium chloride, magnesium chloride, copper(II) chloride, zinc chloride, calcium oxide, magnesium oxide, barium oxide, magnesium sulfate, sodium sulfate, calcium sulfate, copper(II) sulfate, potassium carbonate, and sodium carbonate.

19. The ionic sensor of claim 16, wherein the trivalent salt is selected from the group consisting of aluminum trichloride, gallium trichloride, iron(III) chloride, indium trichloride, cerium chloride, cerium trifluoromethanesulfonate, lanthanide chloride, lanthanide trifluoromethanesulfonate, ytterbium chloride, and ytterbium trifluoromethanesulfonate.

20. The ionic sensor of claim 16, wherein the salt has a concentration selected within the range from 0.1 weight percent to 50 weight percent.

21. The ionic sensor of claim 16, wherein the salt has a concentration of about 10 weight percent, 20 weight percent, 30 weight percent, or 40 weight percent.

22. The ionic sensor of claim 16, wherein the salt comprises a mixture of a divalent salt and a trivalent salt; wherein the divalent salt comprises calcium chloride, magnesium chloride, zinc chloride, or copper chloride; and wherein the trivalent salt comprises aluminum trichloride, gallium trichloride, ferrous trichloride, or indium trichloride.

23. The ionic sensor of claim 16, wherein the hydrogel comprises a crosslinked network of hydrophilic polymer chains dispersed in water in which the salt has been dissolved.

24. The ionic sensor of claim 23, wherein the polymer chains comprise polyacrylamide and/or alginate; and the crosslinks comprise N,N-methylenebisacrylamide and/or calcium sulfate.

25. The ionic sensor of claim 23, wherein the hydrogel composition remains elastic at a minimum temperature less than the freezing temperature of water and greater than or equal to the eutectic temperature of the salt-water phase diagram.

26. The ionic sensor of claim 15, wherein the hydrogel has a freezing point below 020 Celsius.

27. An ionic sensor comprising:
two layers comprising a freeze-resistant hydrogel composition comprising:
a hydrogel comprising an acrylamide polymer in the absence of an alginate;
at least 50% water; and
a hygroscopic monovalent, divalent, or trivalent salt;
a layer of dielectric elastomer between the two layers of the hydrogel; and
two electrodes, wherein each layer of the hydrogel composition is coupled to a respective one of the two electrodes.

28. The ionic sensor of claim 27, wherein the monovalent salt is selected from the group consisting of sodium chloride, lithium chloride, and potassium chloride.

* * * * *